United States Patent
Yamamoto

(10) Patent No.: US 7,277,633 B2
(45) Date of Patent: Oct. 2, 2007

(54) RECEIVING ERROR RATE CONTROL DEVICE

(75) Inventor: Satoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 11/236,633

(22) Filed: Sep. 28, 2005

(65) Prior Publication Data

US 2006/0051104 A1    Mar. 9, 2006

Related U.S. Application Data

(63) Continuation of application No. PCT/JP03/05176, filed on Apr. 23, 2003.

(51) Int. Cl.
H04B 10/08 (2006.01)
H04B 17/00 (2006.01)
H04B 10/06 (2006.01)
H04L 25/06 (2006.01)
H04L 25/10 (2006.01)

(52) U.S. Cl. .......................... 398/27; 398/24; 398/209; 375/317; 714/705

(58) Field of Classification Search .............. 398/24, 398/27, 202, 209; 375/317; 714/704, 705
See application file for complete search history.

(56) References Cited

U.S. PATENT DOCUMENTS 6,069,718 A * 5/2000 Khaleghi .................... 398/27
6,580,531 B1 * 6/2003 Swanson et al. ............ 398/5
6,735,259 B1 * 5/2004 Roberts et al. ............. 375/316
2002/0149812 A1 * 10/2002 Hong et al. ................. 359/110

FOREIGN PATENT DOCUMENTS

| JP | 63-221733 | 9/1988 |
|----|-----------|--------|
| JP | 3-70223 | 3/1991 |
| JP | 04-054043 | 2/1992 |
| JP | 06-85752 | 3/1994 |
| JP | 8-265273 | 10/1996 |
| JP | 9-326755 | 12/1997 |
| JP | 09326755 A * | 12/1997 |

OTHER PUBLICATIONS

Notice of Reason for Rejection issued Jan. 9, 2007 in corresponding Japanese Patent Application No. 2004-571079.

* cited by examiner

Primary Examiner—Jason Chan
Assistant Examiner—Nathan Curs
(74) Attorney, Agent, or Firm—Staas & Halsey LLP

(57) ABSTRACT

A reception error rate controller in which the settling time can be shortened at the time of feedback control by controlling the quality of a received signal when the error rate is low. The reception error rate controller identifies the received signal by comparing it with a reference value, detects the error rate of the identified signal, controls the reference value based on the error rate and further controls the quality of the received signal based on the error rate.

13 Claims, 26 Drawing Sheets

OPTIMUM IDENTIFYING VOLTAGE Vopt

OPTIMUM IDENTIFYING PHASE Popt

RECEIVING ERROR RATE CONTROL DEVICE

CROSS-REFERENCE TO RELATED APPLICATIONS

This application is a continuation of PCT/JP2003/05176 filed on Apr. 23, 2003. The disclosures of international application PCT/JP2003/05176 filed on Apr. 23, 2003 including the specification, drawings and abstract are incorporated herein by reference.

BACKGROUND OF THE INVENTION

The present invention relates to a technology for acquiring stable receiving sensitivity by controlling an error rate of a received signal, and is applied to, e.g., an optical receiving unit of a wavelength multiplexing device in an optical transmission system.

FIG. 22 is a diagram showing an outline of a general type of conventional wavelength multiplexing optical transmission. In this case, an optical signal transmitted from an optical transmitting unit 91 is transmitted across on a transmission path via a wavelength multiplexing unit 92 and an optical amplifier 93, demultiplexed by a wavelength demultiplexing unit 94, then received by an optical receiving unit 95 and properly distributed to a device existing at a rear stage.

FIG. 23 shows a configuration of this optical receiving unit 95. The optical signal having an arbitrary wavelength, which is demultiplexed by the wavelength demultiplexing unit 94, is converted into an electric signal by a photoelectric converting unit 81, and is further converted by an electric signal processing unit 82 into a signal having a speed that facilitates signal processing. Then, this signal is, after an error has been corrected by an error correcting unit 83, converted into a signal (an optical signal in this example) for a subscriber line by a subscriber optical converting unit 84 and distributed to the subscriber side.

Further, FIG. 24 shows automatic identifying point control of keeping an optimum transmission quality by effecting feedback to an electric signal processing unit 82 from an error correction processing unit 83 in the optical receiving unit 95.

As shown in FIG. 24, the error correction processing unit 83 includes an error detecting unit 88 and an error correcting unit 89, wherein an error detected by the error detecting unit 88 is corrected by the error correcting unit 89. Moreover, the error correction processing unit 83 obtains a rate, as an error rate, of the error detected by the error detecting unit 88 to the transmission signal, i.e., as a quantity of deterioration of the transmission quality that is caused due to the transmission path, and feeds this error rate back to the electric signal processing unit 82.

The electric signal processing unit 82 has an identifying unit 85, a serial-to-parallel converting unit 86 and an optimum point control unit 87. The electric signal processing unit 82 identifies the electric signal given from the photoelectric converting unit 81, outputs, after the serial-to-parallel converting unit 86 has converted the signal, this converted signal to the error detecting unit 88, and at the same time controls voltage- and phase-directional optimum identifying points of the signal of the identifying unit 85 so as to minimize the error rate (the deterioration quantity), thus controlling the feedback control so as to attain optimum receiving performance at all times.

FIG. 25 is an explanatory diagram when the identifying unit 85 identifies "1/0" of an input signal. FIG. 25 shows a waveform of the input signal, wherein the axis of ordinates represents time, and the axis of abscissa represents a voltage.

FIG. 25(a) shows a waveform when an SN ratio declines due to the transmission path, wherein the signal originally taking a waveform depicted by bold lines comes to take a waveform distorted due to the decline in a range indicated by narrow lines.

The identifying unit 85 has a function of identifying this waveform in the voltage-direction and a function of identifying the waveform in the phase-direction. The identifying unit 85, in the case of identifying the waveform in the voltage-direction, if a voltage of the input signal exceeds an identifying voltage Vopt indicated by a dashed double-dotted line, identifies the waveform as "1" and, if not, identifies it as "0", whereby a specified voltage corresponding to "1" or "0" is outputted.

Accordingly, a waveform subsequent to the voltage-directional identification takes, as shown in FIG. 25(b), a specified value in the voltage-direction but has a distortion (scatter) in the phase-direction.

Then, the identifying unit 85, in the case of making the phase-directional identification, identifies "1" or "0" when the input signal is in an identifying phase Popt indicated by a dashed double-dotted line, and, if identified as "1", outputs specified rising and falling signals on the basis of the identifying phase Popt.

Namely, the waveform after making the voltage-and phase-directional identification becomes as specified both in voltage and in phase as shown in FIG. 25(c).

At this time, a proper identifying voltage and a proper identifying phase differ depending on a degree of distortion, etc. of the waveform, and hence an error rate is obtained in a way that makes different each of the identifying voltage and the identifying phase. The control (optimum point control) is conducted to obtain such an identifying voltage and an identifying phase as to minimize this error rate.

FIG. 26 shows a change in the error rate (an error rate characteristic) in the case of making different the identifying voltage and the identifying phase.

As shown in FIG. 26, the error rate characteristic plots a curve in which the error rate is minimized at such points that the identifying voltage and the identifying phase are optimized, and becomes larger as deviated more greatly from these optimum points. Then, when the SN ratio declines, the error rate is shifted on a larger side than when the SN ratio is enhanced.

Accordingly, the error rate is controlled to ERR2 when the SN ratio of the input signal declines and controlled to ERR1 when the SN ratio is enhanced. Note that ERR3 is a parameter determined by a capacity of the error correcting unit, and the error rate equal to or smaller than this threshold value ERR3 is required.

Patent document 1
Japanese Patent Application Laid-Open Publication No. H03-70223
Patent document 2
Japanese Patent Application Laid-Open Publication No. S63-221733
Patent document 3
Japanese Patent Application Laid-Open Publication No. H04-54043
Patent document 4
Japanese Patent Application Laid-Open Publication No. H09-326755

SUMMARY OF THE INVENTION

Under the conventional optimum point control, when the input takes whatever SN ratio, there is formed a negative feedback loop converging at the optimum identifying point. Hence, when the input SN is enhanced, the operation is performed to acquire a transmission quality that is by far higher than the necessary error rate (ERR in this case) determined by the capacity of the error correcting unit 89, and therefore the following problem arise.

(1) In the case of a good error rate (error rate is low), as a matter of course, an error count per unit time is small, and hence control time for executing the optimum control becomes extremely long, with the result that there is no alternative but to set control loop response time retardant.

Consequently, there arises a problem that initial startup takes a considerable period of time, and startup time of the system also increases.

(2) If the time for effecting the optimum control is extremely long because of the error count being small as described above, there is a method of changing an optimum control algorithm and, when getting equal to or lower than a predetermined error rate, stopping the control. Namely, the identifying voltage and the identifying phase are determined to take values deviating from the optimum points. As shown in FIG. 26, however, the error rate characteristic has a small gradient in the vicinity of the optimum point and a larger gradient as deviated farther from the optimum point. Hence, in the case of determining the value deviating from the optimum point as by the method, it follows that there is a large fluctuation of the error rate when fluctuating the identifying voltage and the identifying phase. Accordingly, there is a necessity of taking precision resolution of the control, a DA converter, etc. is required of high performance, and this leads to an increase in circuit scale and causes problems in terms of the scale and costs.

The present invention was devised in view of the problems inherent in the prior arts described above. Namely, the present invention provides a technology contrived to reduce the converging time when performing the feedback control by controlling a quality of a receiving signal if the error rate is low.

The present invention adopts the following means in order to solve the above problems.

Namely, a receiving error rate control device according to the present invention comprises an identifying unit for identifying a received signal by comparing the received signal with a reference value, an error detecting unit for detecting an error rate of the signal identified by the identifying unit, a feedback control unit for controlling the reference value on the basis of the error rate detected by the error detecting unit, and a quality control unit for performing control of making erroneous a post-identifying signal with respect to the receiving signal on the basis of the error rate detected by the error detecting unit.

In the receiving error rate control device, the identifying unit may include a voltage identifying unit for identifying the received signal by comparing the receiving signal with an identifying voltage serving as the reference value, the feedback control unit may control the identifying voltage on the basis of the error rate detected by the error detecting unit, and the quality control unit may include an amplifying unit for amplifying a difference between the error rate detected by the error rate detecting unit and a reference error rate and a modulating unit for amplitude-modulating a noise corresponding to this amplitude difference, and may add the amplitude-modulated noise to the identifying voltage.

In the receiving error rate control device, the identifying unit may further include a voltage identifying unit for identifying the received signal on the basis of a reference phase.

In the receiving error rate control device, the quality control unit may include a noise generating unit for generating a thermal noise as the "noise", and a gain variable unit for controlling a noise quantity by amplifying this thermal noise.

Further, a receiving error rate control device according to the present invention comprises a photoelectric converting unit for converting a received optical signal into an electric signal, an identifying unit for identifying the electric signal by comparing the electric signal with a reference value, an error detecting unit for detecting an error rate of the signal detected by the identifying unit, a feedback control unit for controlling the reference value on the basis of the error rate detected by the error detecting unit, and a quality control unit for controlling a quality by making erroneous the post-identifying signal with respect to the electric signal that is subjected to the conversion by the photoelectric converting unit on the basis of the error rate detected by the error detecting unit.

In the receiving error rate control device, the photoelectric converting unit may convert the optical signal into the electric signal by use of an avalanche photo diode, and the quality control unit may control a quality of the electric signal by changing a reverse bias voltage of the avalanche photo diode on the basis of the error rate.

In the receiving error rate control device, the quality control unit may include a noise generating unit for generating a noise and a modulating unit for modulating the reverse bias voltage of the avalanche photo diode by use of the noise.

Moreover, a receiving error rate control device according to the present invention comprises a photoelectric converting unit for converting a received optical signal into an electric signal, a band control unit for controlling a band of the electric signal, an identifying unit for identifying the electric signal by comparing the electric signal with a reference value, a detecting unit for detecting an error rate of the signal identified by the identifying unit, a feedback control unit for controlling the reference value on the basis of the error rate detected by the error detecting unit, and a quality control unit for controlling a quality of the electric signal by controlling a control voltage of the band control unit on the basis of the error rate detected by the error detecting unit.

Still further, a receiving error rate control device according to the present invention comprises an optical amplifying unit for amplifying a received optical signal, a photoelectric converting unit for converting the received optical signal into an electric signal, an identifying unit for identifying the electric signal by comparing the electric signal with a reference value, an error detecting unit for detecting an error rate of the signal identified by the identifying unit, a feedback control unit for controlling the reference value on the basis of the error rate detected by the error rate detecting unit, and a quality control unit for controlling a quality of the optical signal by modulating a control voltage of the optical amplifying unit on the basis of the error rate detected by the error rate detecting unit.

Yet further, a receiving error rate control device according to the present invention comprises an optical attenuation unit for attenuating a received optical signal, a photoelectric converting unit for converting the received optical signal into an electric signal, an identifying unit for identifying the electric signal by comparing the electric signal with a reference value, an error detecting unit for detecting an error rate of the signal identified by the identifying unit, a feedback control unit for controlling the reference value on the basis of the error rate detected by the error rate detecting unit, and a quality control unit for controlling a quality of the optical signal by modulating a control voltage of the optical attenuation unit on the basis of the error rate detected by the error rate detecting unit.

In the receiving error rate control device, the quality control unit may include a noise generating unit for generating a noise and a modulating unit for modulating a control voltage of the attenuation unit by use of this noise.

Moreover, a receiving error rate control device according to the present invention comprises a photoelectric converting unit for converting a received optical signal into an electric signal, an identifying unit for identifying the electric signal by comparing the electric signal with a reference value, an error detecting unit for detecting an error rate of the signal identified by the identifying unit, a feedback control unit for controlling the reference value on the basis of the error rate detected by the error rate detecting unit, and a quality control unit for controlling a quality of the optical signal on the basis of the error rate detected by the error rate detecting unit.

In the receiving error rate control device, the quality control unit may include an amplifying unit for amplifying a difference between the error rate detected by the error detecting unit and a reference error rate, a noise generating unit for generating a noise corresponding to this amplified difference, a photo electric converting unit for converting the noise into an optical signal, and an optical coupling unit for adding the noise converted into the optical signal to an optical signal to be received by the photoelectric converting unit.

DETAILED DESCRIPTION OF THE PREFERRED EMBODIMENTS

Embodiments of the present invention will hereinafter be described with reference to the accompanying drawings.

First Embodiment

Figure 1:
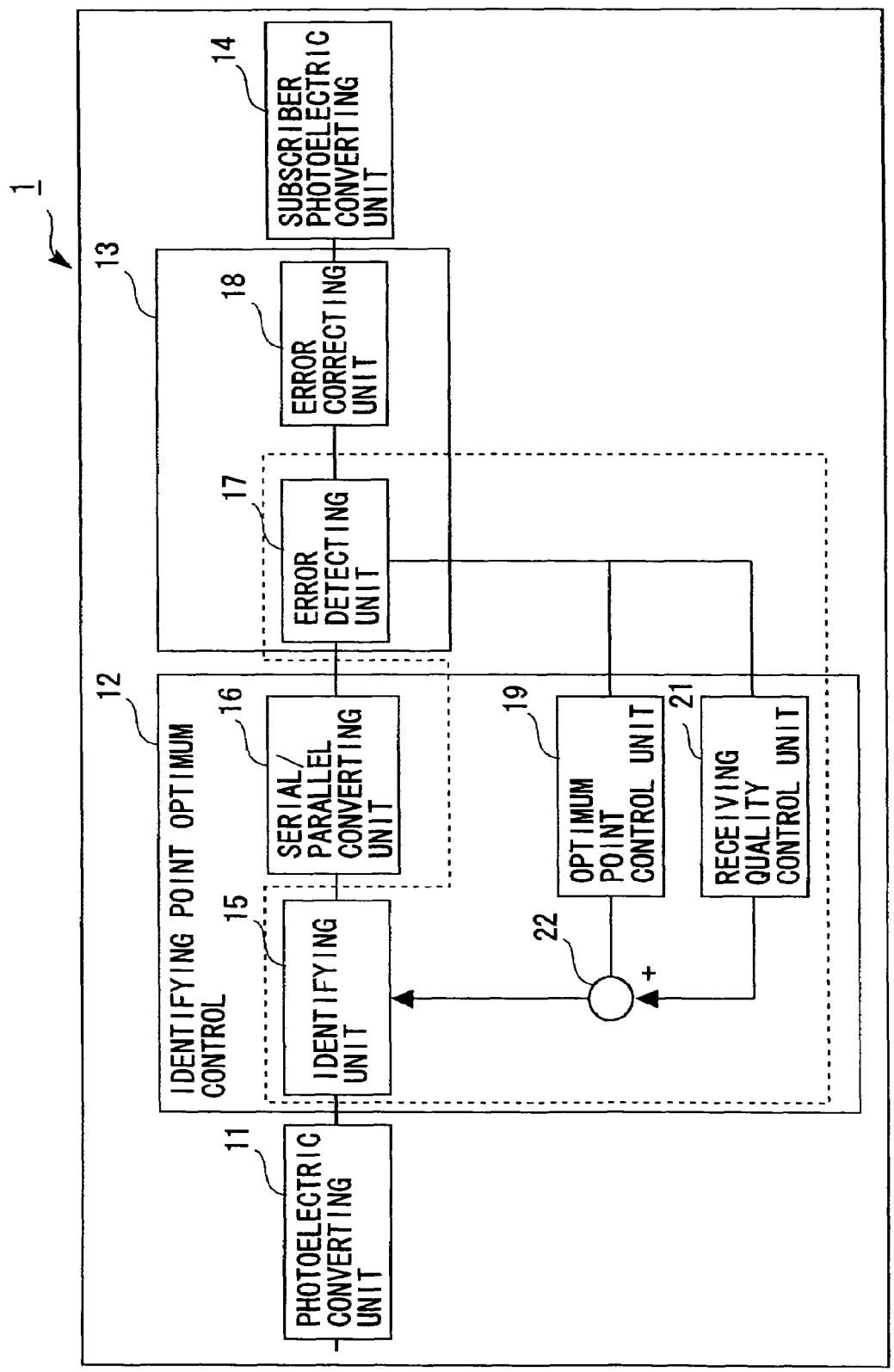
FIG. 1 is a diagram of an outline of configuration in a first embodiment of the present invention.
Figure 2:
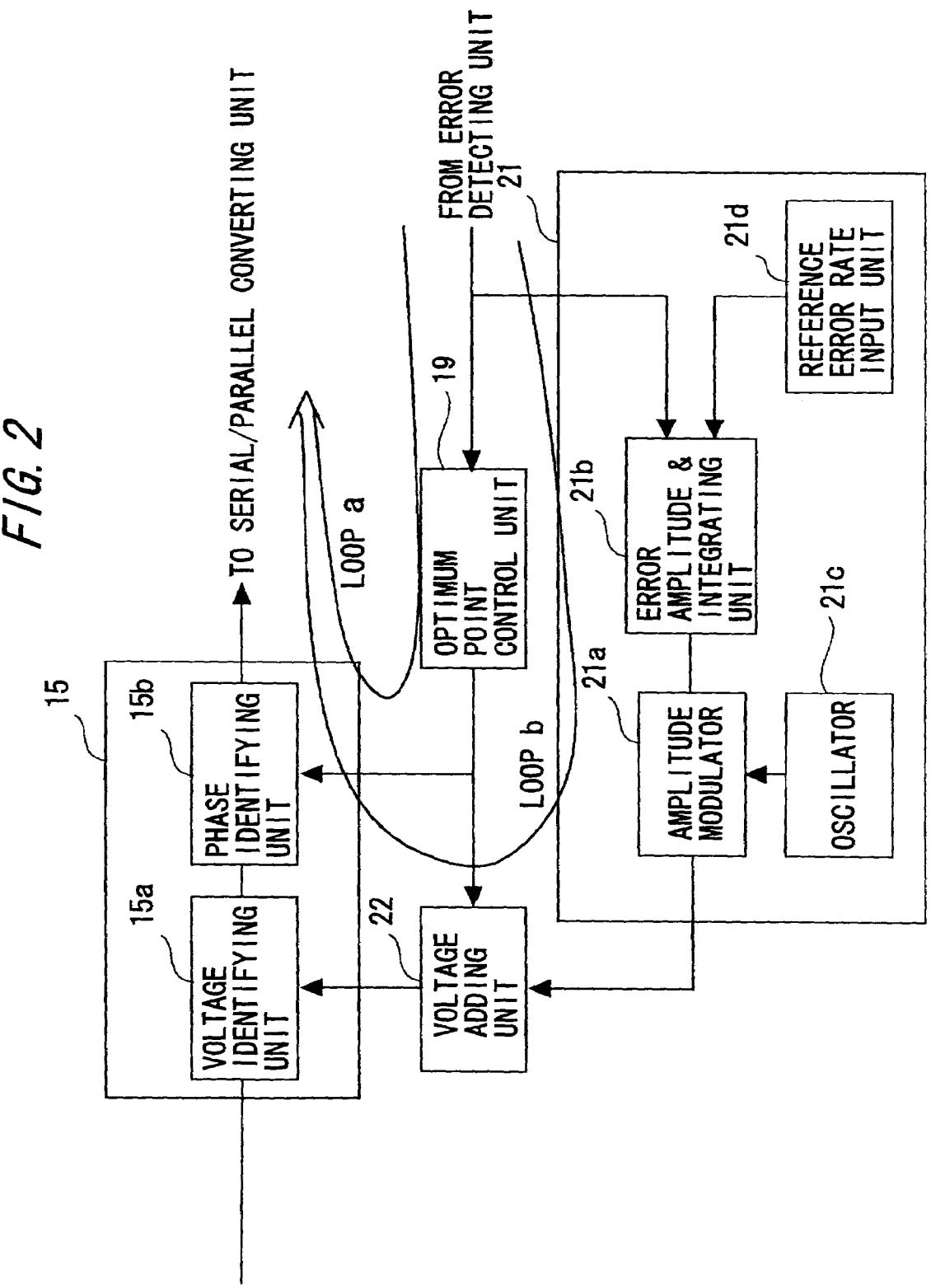
FIG. 2 is a block diagram of principal units in the first embodiment of the present invention.
Figure 22:
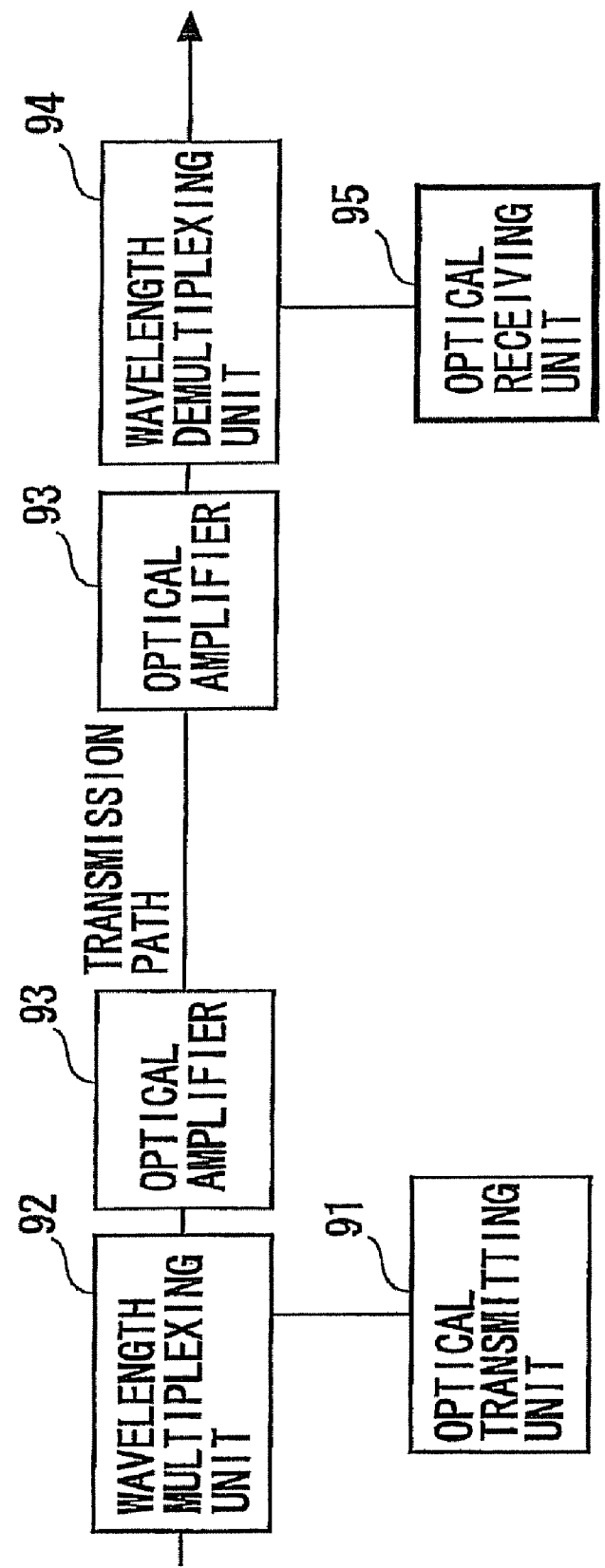
FIG. 22 is a diagram of an outline of wavelength multiplexing transmission.
Figure 23:
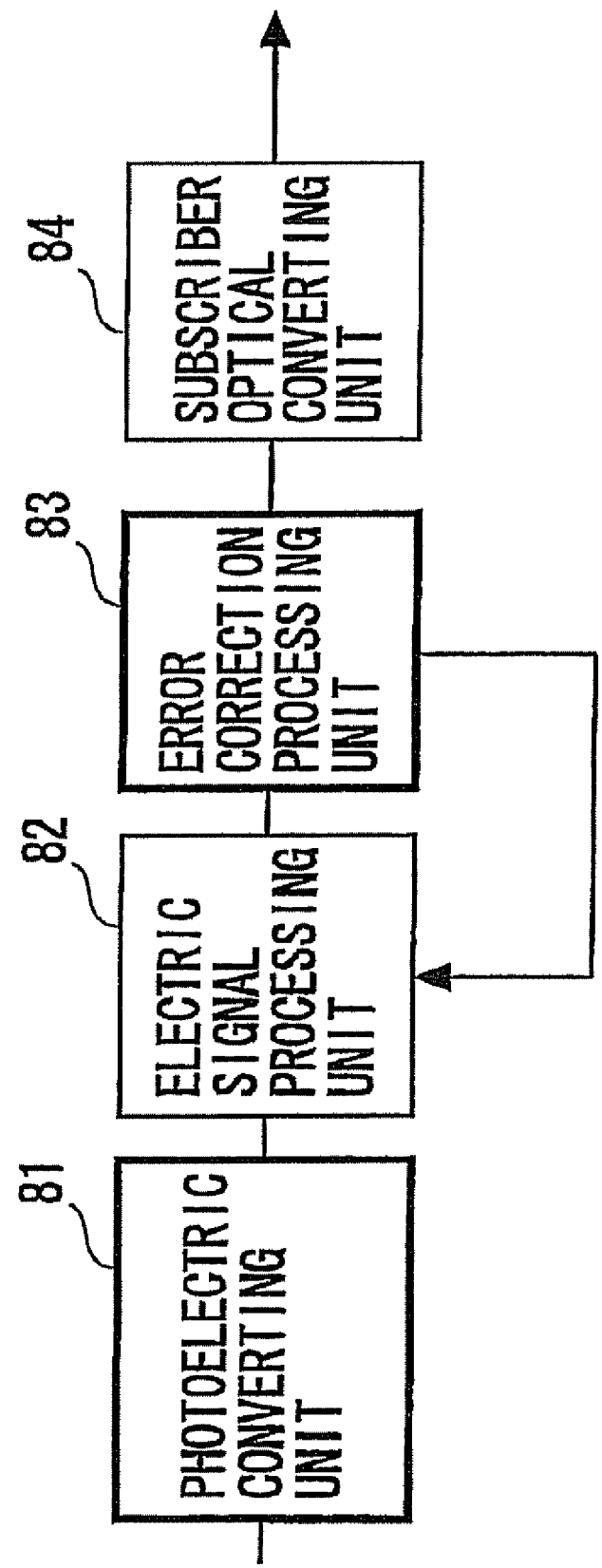
FIG. 23 is a diagram of a configuration of a conventional optical receiving unit.
Figure 24:
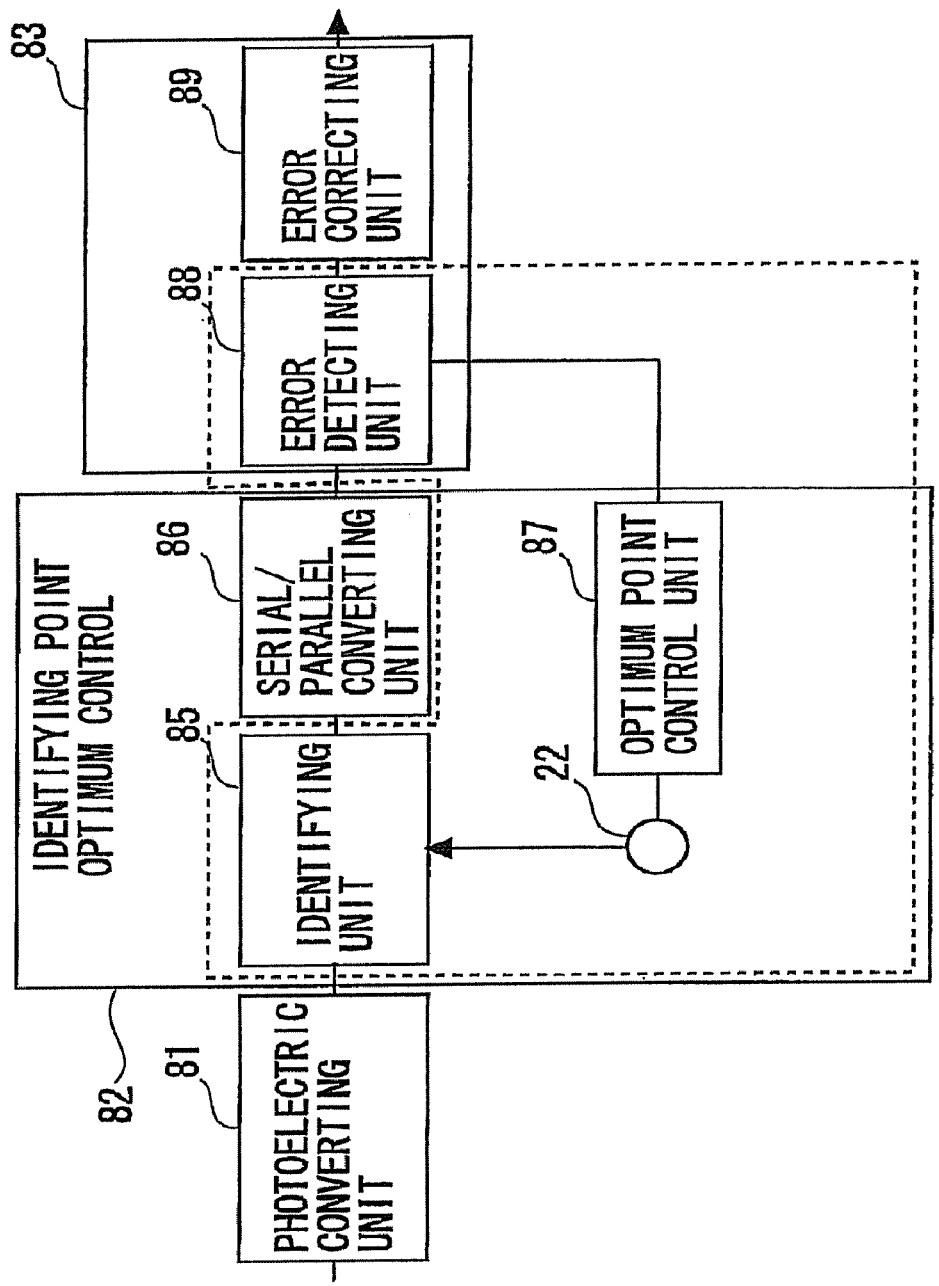
FIG. 24 is a diagram of a configuration of the conventional optical receiving unit.
Figure 25A:
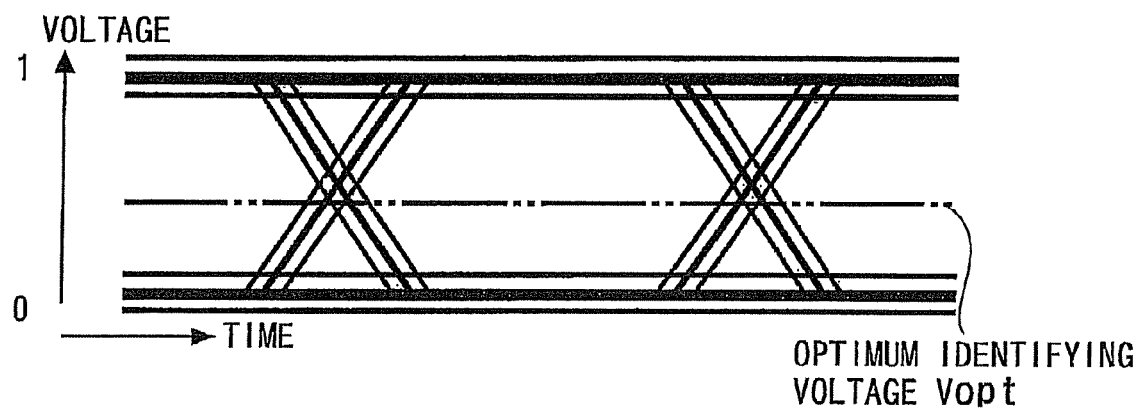
FIGS. 25A-25C are diagrams of a principle of identifying a waveform.
Figure 25B:
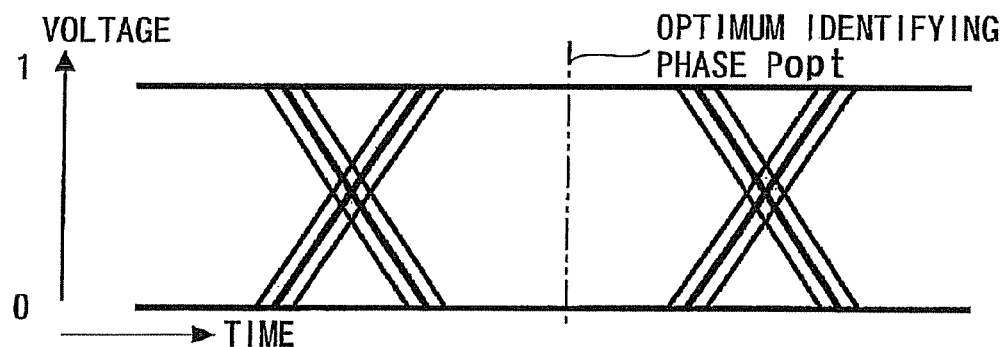
Figure 25C:
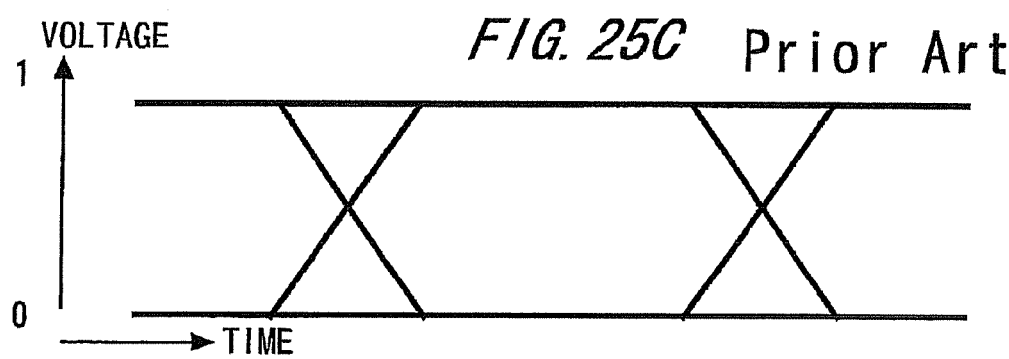
Figure 26:
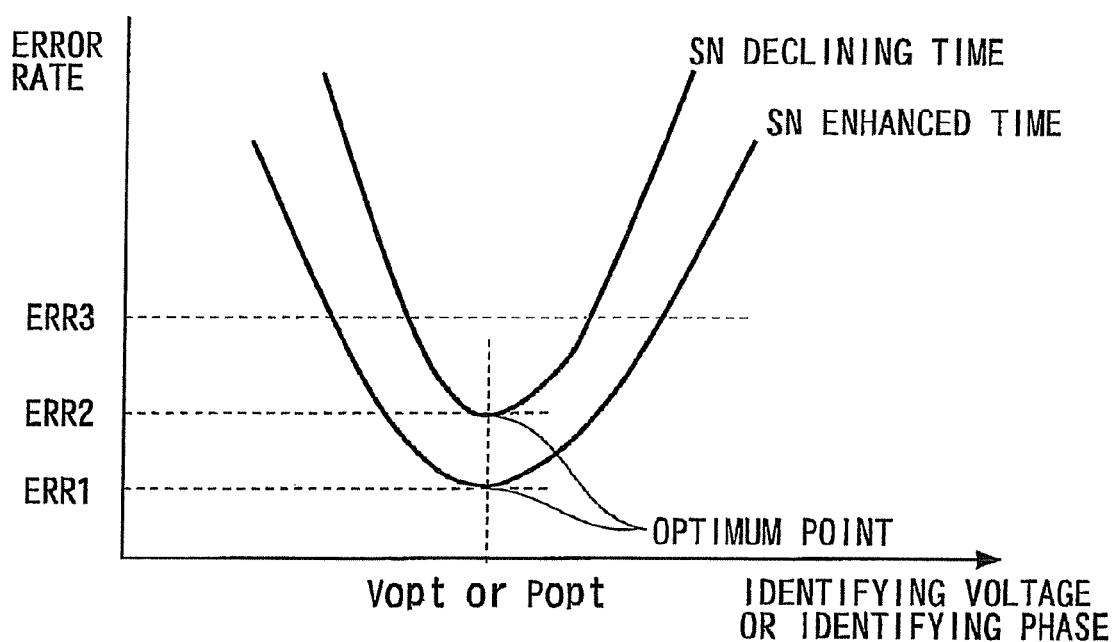
FIG. 26 is a diagram showing an error rate characteristic based on a conventional method.

FIG. 1 is a diagram showing an outline of configuration of a receiving error rate control device by way of one embodiment according to the present invention. FIG. 2 is an explanatory diagram of an electric signal processing unit provided in the receiving error rate control device. A receiving error rate control device 1 in the first embodiment corresponds to an optical receiving unit 95 employed for the aforementioned wavelength multiplexing optical transmission shown in FIG. 22.

The receiving error rate control device 1 includes a photoelectric converting unit 11, an electric signal processing unit 12, an error correcting unit 13 and a subscriber photoelectric converting unit 14.

The photoelectric converting unit 11 converts, into an electric signal, an optical signal having an arbitrary wavelength that is demultiplexed by a wavelength demultiplexing unit 94.

The electric signal processing unit 12 includes an identifying unit 15, a serial-to-parallel converting unit 16, an optimum point control unit (corresponding to a feedback control unit) 19 and a receiving quality control unit 21.

Figure 3:
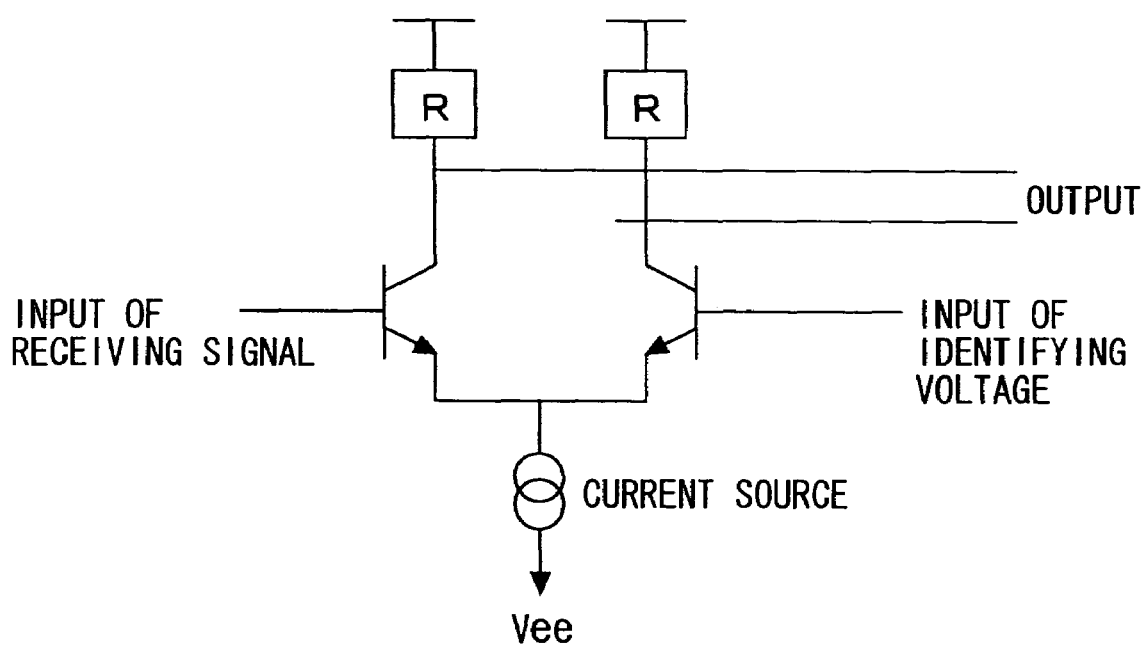
FIG. 3 is a diagram showing an example of a voltage identifying unit.
Figure 4:
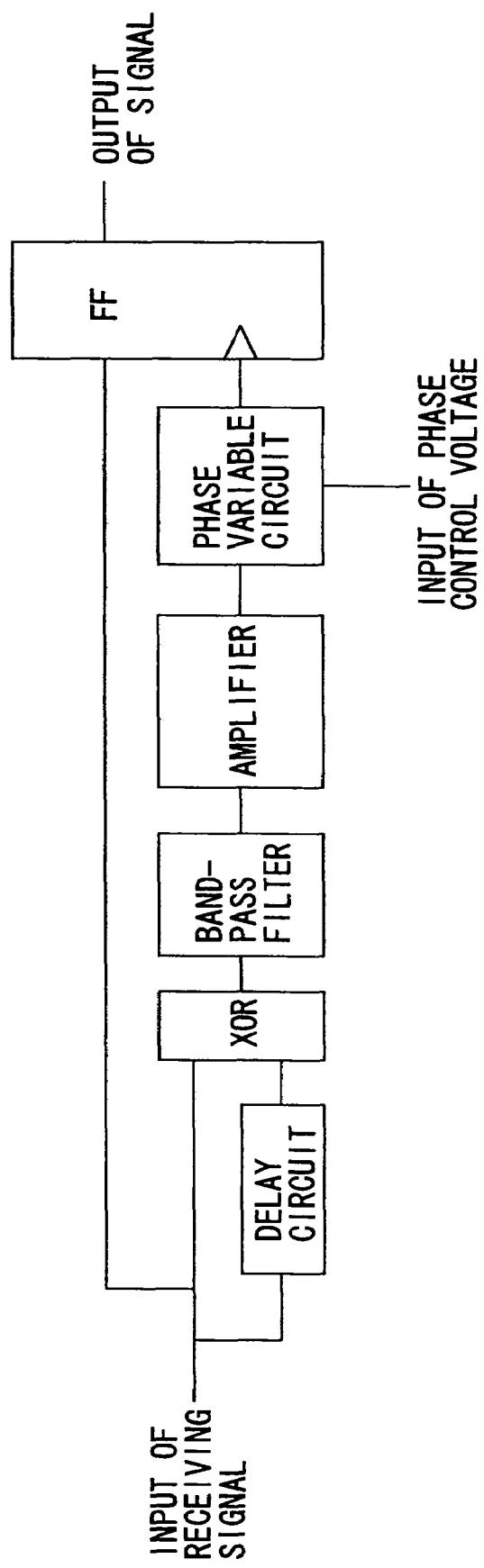
FIG. 4 is a diagram showing an example of a phase identifying unit.

The identifying unit 15 identifies a received signal by comparing this received signal with a reference value. As shown in FIG. 2, the identifying unit 15 has a voltage identifying unit 15a and a phase identifying unit 15b. FIG. 3 shows an example of a configuration of the voltage identifying unit 15a, wherein the voltage identifying unit 15a compares the received signal with an identifying voltage (corresponding to a reference value), identifies the received signal as "1" when the received signal has a voltage equal to or higher than the identifying signal, and identifies the received signal as "0" when the received signal has the voltage is lower than the identifying signal, thus outputting a specified voltage corresponding to 1 or 0. Further, FIG. 4 shows an example of a configuration of the phase identifying unit 15b, wherein the phase identifying unit 15b identifies as to whether the received signal is "1" or "0" when the received signal is in an identifying phase Popt, and outputs, when being "1", specified rising and falling signals on the basis of the identifying phase Popt.

The optimum point control unit 19 optimally controls the identifying voltage on the basis of an error rate detected by an error detecting unit 17 of the error correcting unit 13.

The serial-to-parallel converting unit 16 converts a serial signal identified by the identifying unit 15 into a parallel signal, thus making a conversion into a signal having a low frequency.

The quality control unit 21 effects control of making the post-identifying signal erroneous with respect to the received signal on the basis of the error rate detected by the error detecting unit 13. In the first embodiment, one example of the control of making the post-identifying signal erroneous is that the identification is made erroneous by superposing noises on the identifying voltage of the identifying unit 15, thus acquiring a predetermined error rate signal. The quality control unit 21 includes, as shown in FIG. 2, an amplitude modulation unit 21a, an error amplifying & integrating unit 21b, an oscillator 21c and a reference error rate input unit 21d.

The reference error rate input unit 21d inputs a reference voltage corresponding to a predetermined reference error rate to the error amplifying & integrating unit 21b. In the first embodiment, the reference error rate is set so that the error rate becomes ERR2 as will be described later on.

Figure 5:
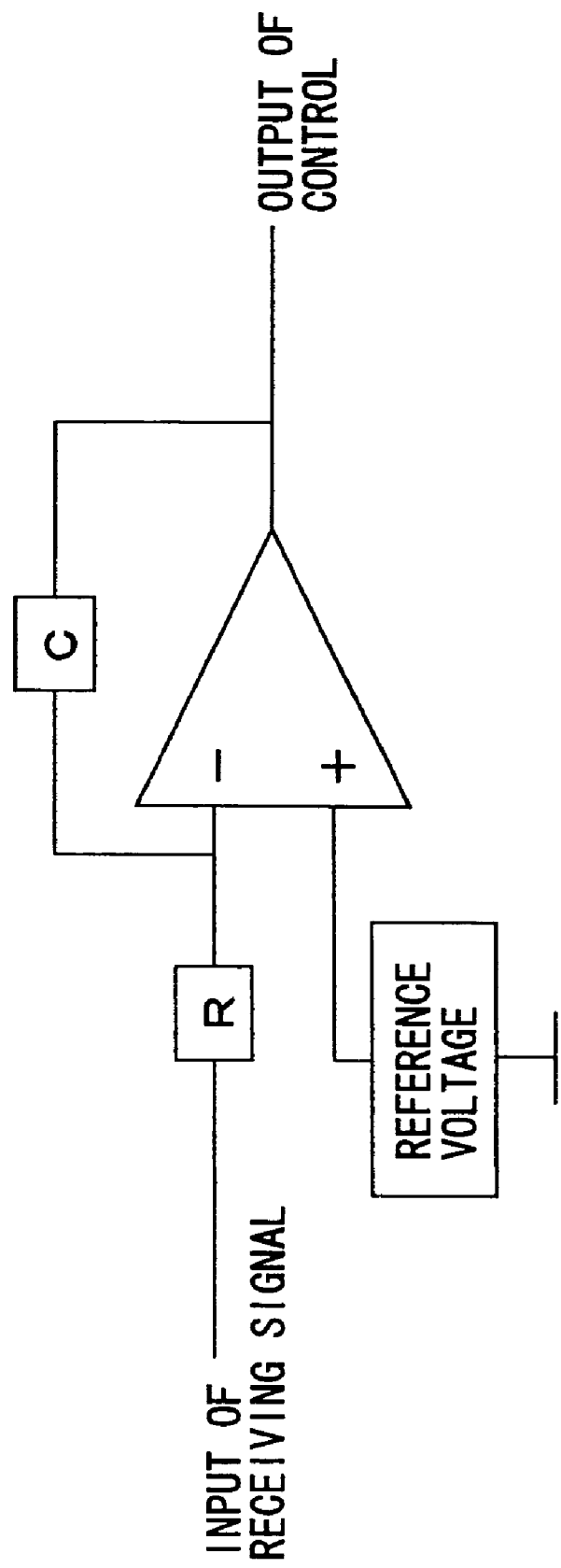
FIG. 5 is a diagram showing an example of an error amplifying & integrating unit.

The error amplifying & integrating unit 21b, as shown in FIG. 5, amplifies a difference between the error rate detected by the error detecting unit and the reference error rate.

The oscillator 21c outputs a signal (sine wave in the example) having a predetermined frequency as a noise to the amplitude modulation unit 21a.

Figure 6:
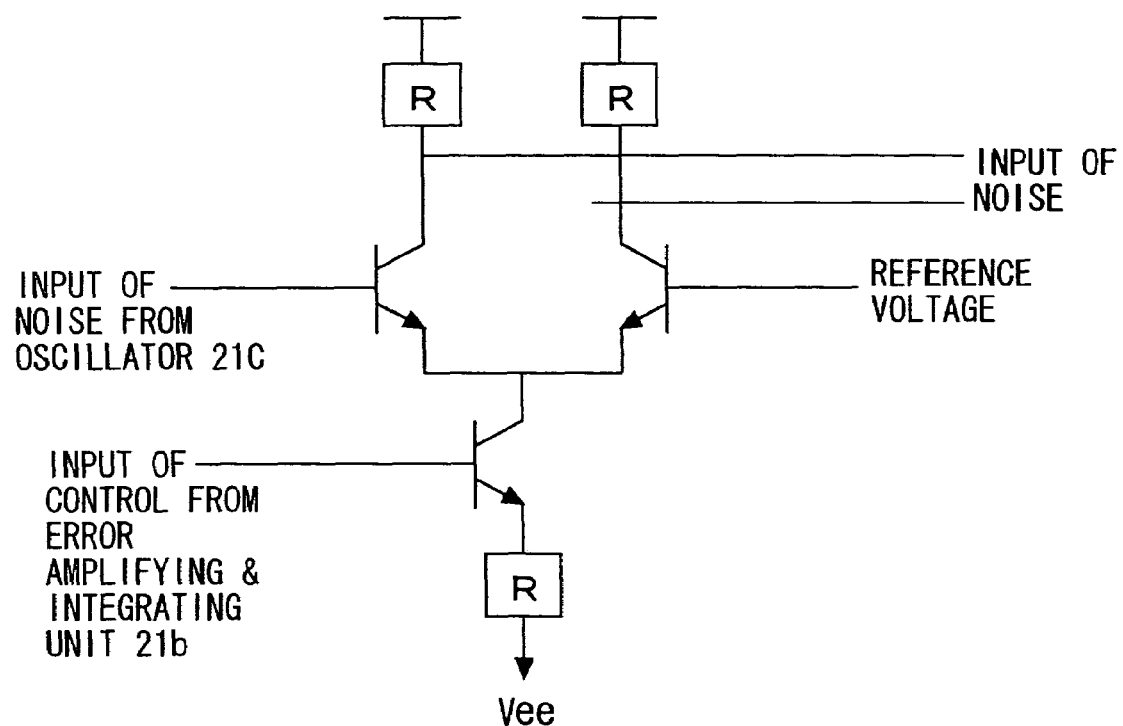
FIG. 6 is a diagram showing an example of an amplitude modulating unit.

The amplitude modulation unit 21a, as shown in FIG. 6, amplitude-modulates an output from the error amplifying & integrating unit 21b with the noise given from the oscillator 21c, and outputs the modulated output to a voltage adding unit 22.

Figure 7:
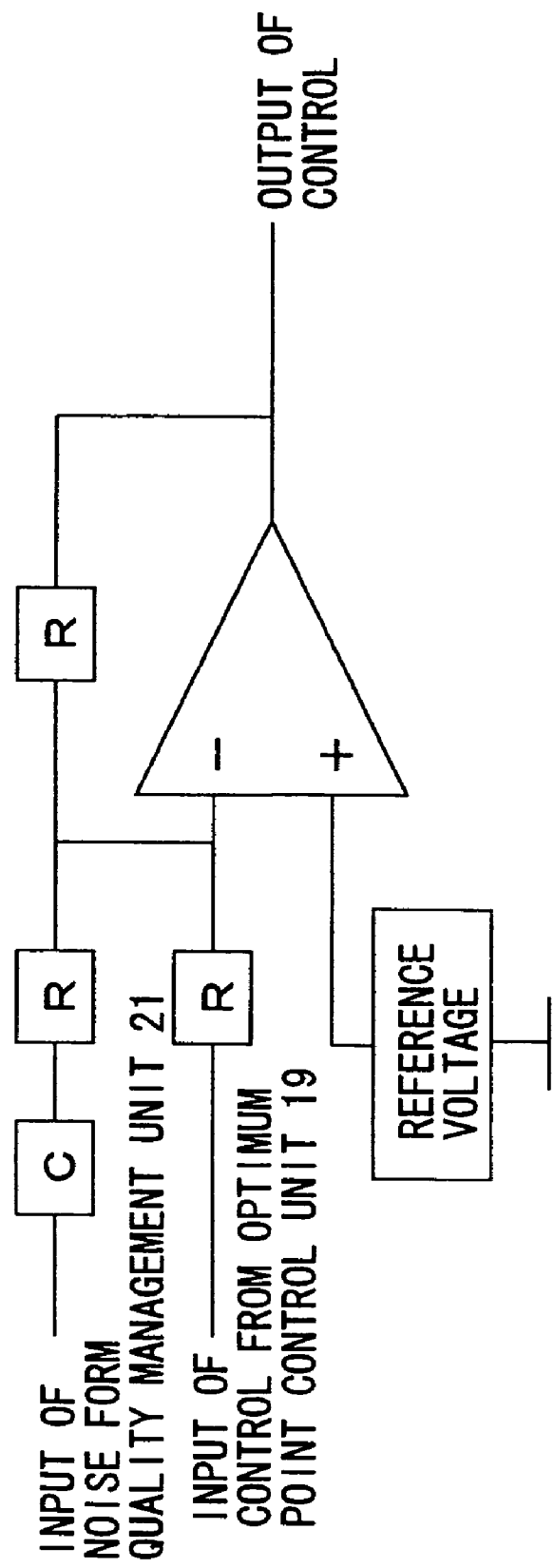
FIG. 7 is a diagram showing an example of a voltage adding unit.

The voltage adding unit 22, as shown in FIG. 7, superposes a noise given from the quality control unit 21 on an output given from the optimum point control unit 19, and inputs the noise-superposed output as an identifying voltage to the voltage identifying unit 15a.

Further, the error correction processing unit 13 includes the error detecting unit 17 and an error correcting unit 18, wherein the error correcting unit 18 corrects an error detected by the error detecting unit 17. Further, the error correction processing unit 13 obtains, as an error rate, an error-to-signal rate of the error detected by the error detecting unit 17 to a transmission signal, and feeds this error rate back to the electric signal processing unit 12.

The subscriber optical converting unit 14 converts the electric signal, of which the error is corrected by the error correction processing unit 13, into a signal (an optical signal in this example) for a subscriber line, and distributes the optical signal to a subscriber side.

With these configurations, in the receiving error rate control device 1, when receiving the optical signal having the arbitrary wavelength that is demultiplexed by the wavelength demultiplexing unit 94, the photoelectric converting unit 11 converts the optical signal into the electric signal, then the electric signal processing unit 12 converts the electric signal into a signal having a speed easy to perform the signal processing, and, after the error has been corrected by the error correcting unit 13, the subscriber optical converting unit 14 converts the signal into the optical signal for the subscriber line, thereby distributing the optical signal to the subscriber side.

Further, the receiving error rate control device 1 in the first embodiment feeds the error rate detected by the error correction processing unit 13 back to the electric signal processing unit 12, and the electric signal processing unit 12 effects the optimum point control and the quality control in order to acquire a proper receiving signal quality.

Figure 8:
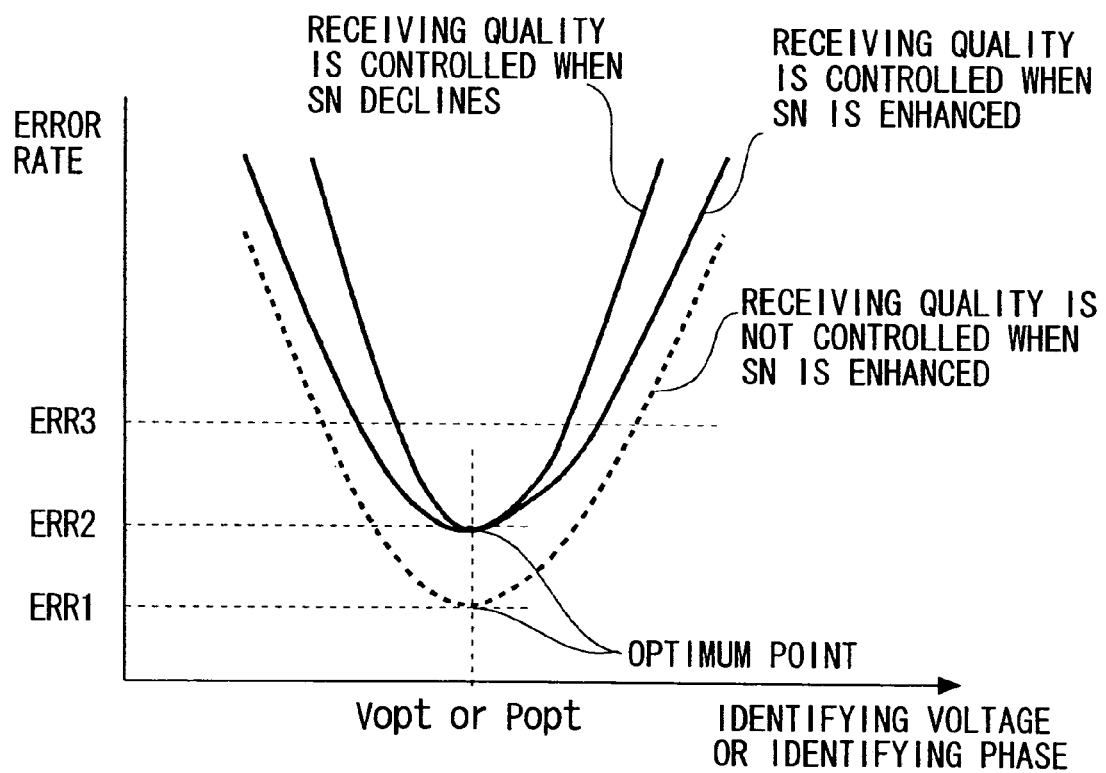
FIG. 8 is a graphic chart showing an error rate characteristic 1 according to the present invention.
Figure 9:
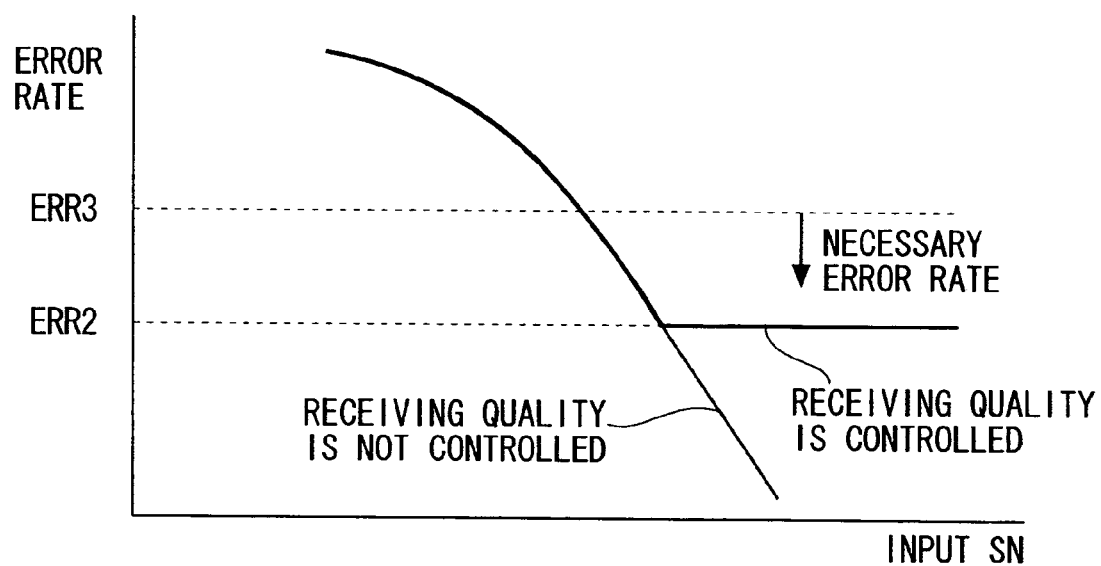
FIG. 9 is a graphic chart showing an error rate characteristic 2 according to the present invention.

At this time, the quality control unit 21, if the error rate of the received signal is excessively low, compares this error rate with the reference error rate, amplifies a different therebetween, and superposes and adds a noise onto the identifying voltage. Then, the identifying unit 15 identifies by use of this noise-added identifying signal, the error detecting unit 17 obtains an error rate, and the optimum point control unit 19 executes the optimum point control based on this error rate. FIGS. 8 and 9 show error rate characteristics in the receiving error rate control device 1 in the first embodiment.

Thus, in the receiving error rate control device 1 in the first embodiment, if the error rate is excessively low, the error rate is increased by adding the noise to the identifying voltage and is thereby converged at the proper error rate ERR2 as shown FIGS. 8 and 9, thus performing the control.

Accordingly, even when the SN ratio is preferable and when the error rate is small, the feedback control can be quickly conducted without controlling to an excessively low optimum point ERR1.

In this case also, if the convergent error rate ERR2 is set lower than an upper-limit error rate ERR3 of the error correctable by the error correcting unit 18, the error can be corrected by the error correcting unit 18, and hence an accurate signal is obtained.

Second Embodiment

Figure 10:
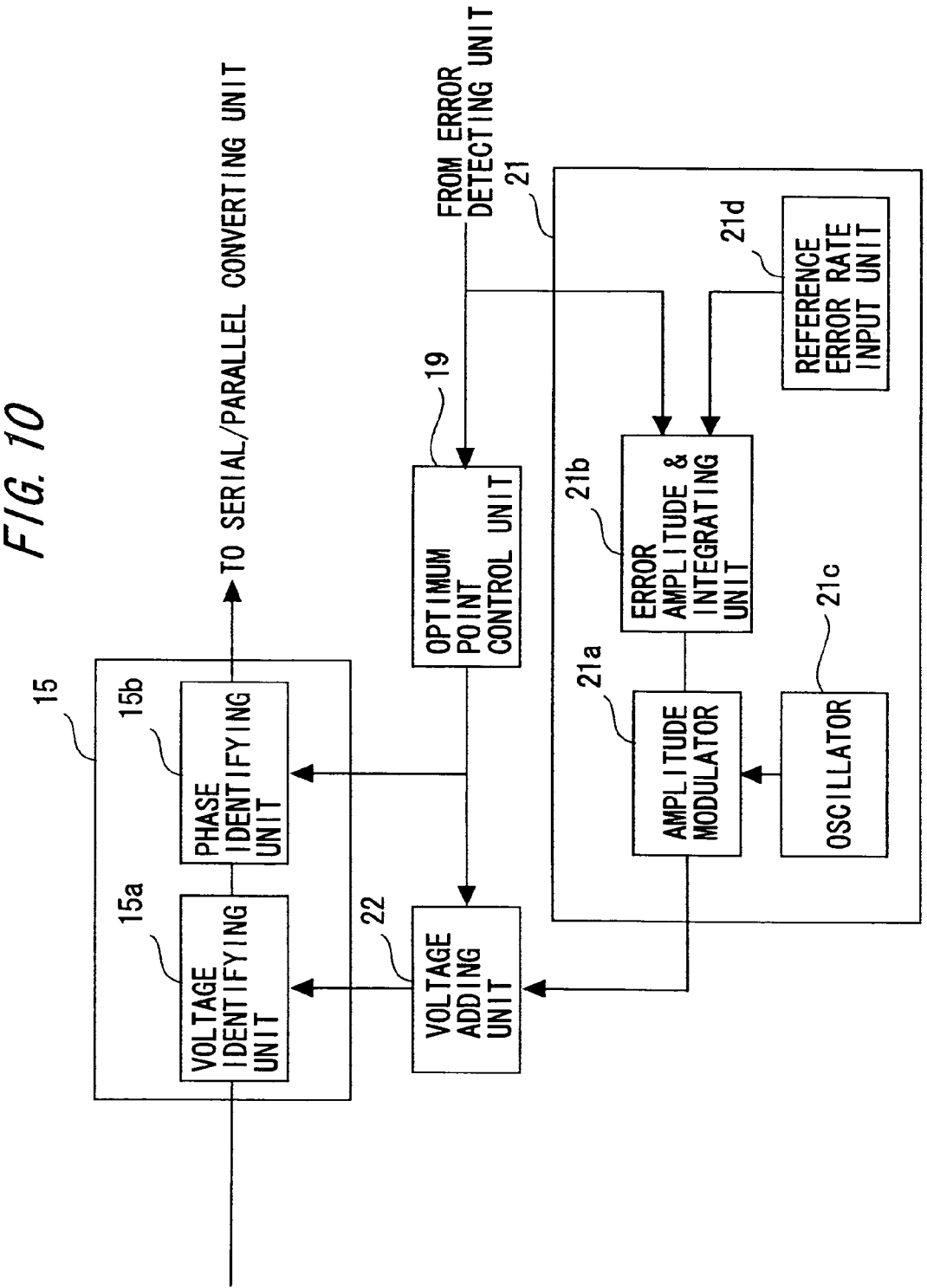
FIG. 10 is a block diagram of principal units in a second embodiment of the present invention.

FIG. 10 is a diagram showing a configuration of principal units in a second embodiment of the present invention. A different point of the second embodiment from the first embodiment discussed above is that the feedback control is effected also for the identification by the phase identifying unit 5b. Note that other configurations are substantially the same, and therefore the same components are marked with the same numerals and symbols in a way that omits their repetitive explanations.

The optimum point control unit 19 in the second embodiment optimally controls the identifying voltage and the identifying phase on the basis of the error rate detected by the error detecting unit 17 of the error correcting unit 13.

The optimum point control unit 19 at first applies the identifying voltage to the voltage identifying unit 15a in a way that makes the identifying voltage different by predetermined values, then acquires a fluctuation of the error rate at this time on the basis of the error rate given from the error detecting unit 17, and controls the identifying voltage so as to minimize the error rate. Next, the optimum point control unit 19 controls a phase voltage in a procedure of applying a phase control voltage as an identifying phase to the phase identifying unit 5b in a way that makes the phase control voltage different by predetermined values, acquiring a fluctuation of the error rate at this time on the basis of the error rate given from the error detecting unit 17, and optimally controlling the identifying voltage and the identifying phase so as to minimize the error rate.

Note that the procedure of optimally controlling the identifying voltage and the identifying phase is not limited to the example given above, and the known feedback control can be applied.

In the second embodiment also, as in the first embodiment, even when the error rate is small, the control is conducted to obtain the proper error rate ERR2 without performing the control till reaching the excessively low optimum point ERR1, and hence the feedback control can be quickly executed.

Third Embodiment

Figure 11:
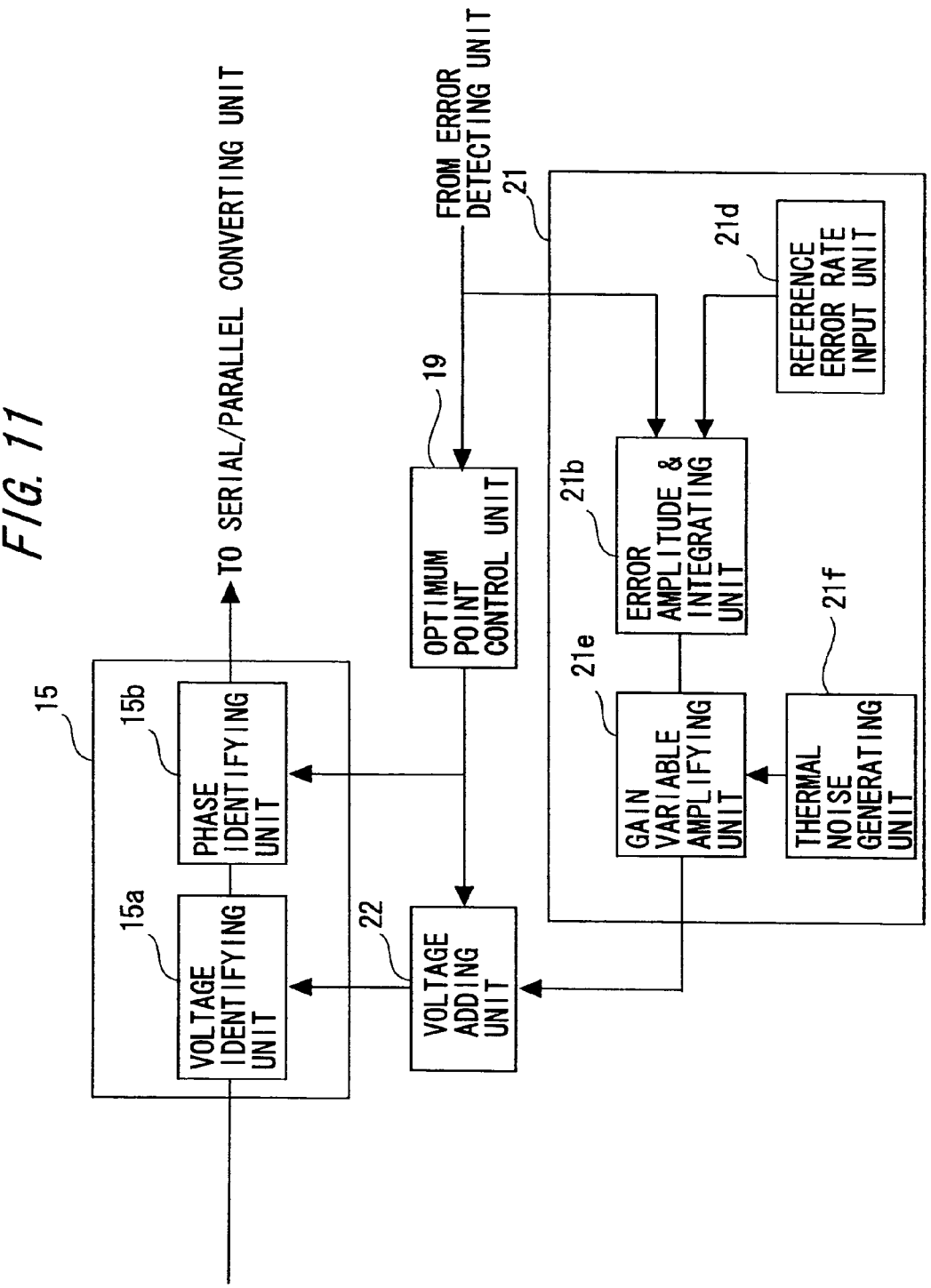
FIG. 11 is a block diagram of principal units in a third embodiment of the present invention.

FIG. 11 is a diagram showing a configuration of principal units in a third embodiment of the present invention. A different point of the third embodiment from the second embodiment discussed above is that a thermal noise generating unit serves as a noise generating source. Note that other configurations are substantially the same, and therefore the same components are marked with the same numerals and symbols in a way that omits their repetitive explanations.

A quality control unit 21 in the third embodiment includes a gain variable amplifying unit (corresponding to a gain variable unit) 21e, a thermal noise generating unit 21f, an error amplifying & integrating unit 21b and a reference error rate input unit 21d.

Figure 12:
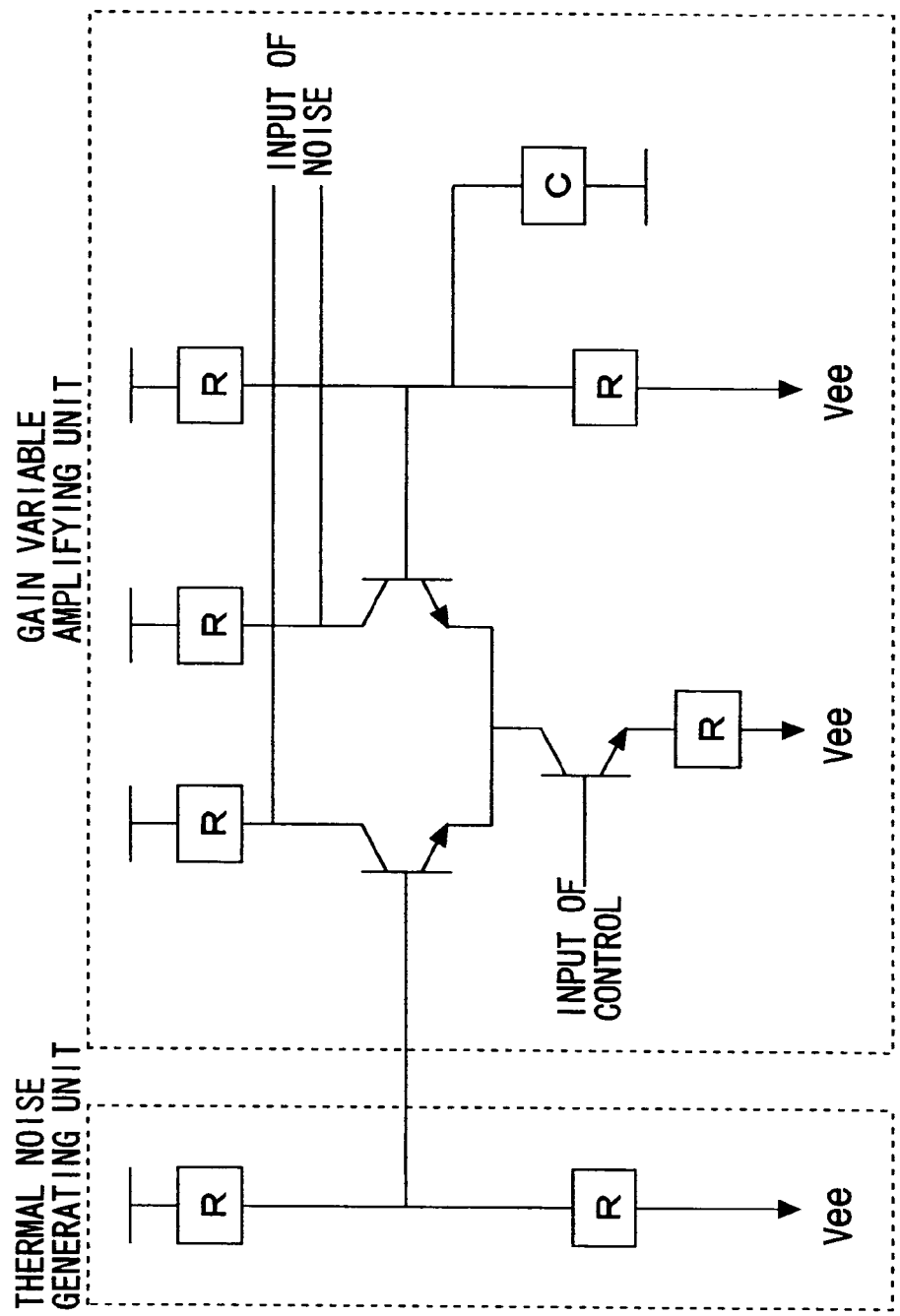
FIG. 12 is a diagram showing an example of a thermal noise generating unit and a gain variable amplifying unit.

FIG. 12 shows a specific example of the gain variable amplifying unit 21e and the thermal noise generating unit 21f.

The thermal noise generating unit 21f inputs a thermal noise generated at a resistor R to the gain variable amplifying unit 21e.

The gain variable amplifying unit 21f, which receives an input of the error rate and the control signal with the amplified difference between the error rate and the reference error rate from the error amplifying & integrating unit 21b, amplifies the thermal noise in accordance with this control signal and outputs the amplified thermal noise to the voltage adding unit 22. Namely, the gain variable amplifying unit 21e, when the error rate detected by the error detecting unit 17 is by far larger than the reference error rate with the result that the gain gets large, increases an output of the noise and, when the error rate detected by the error detecting unit 17 becomes approximate to the reference error rate with the result that the gain gets small, decreases the output of the noise. Further, the gain variable amplifying unit 21e does not output the noise when the error rate detected by the error detecting unit 17 is lower than or equal to the reference error rate.

As described above, according to the third embodiment, the quality of the receiving signal can be controlled with a comparatively simple configuration by making the use of the thermal noise as the "noise", and the same effects as those in the embodiments discussed above can be acquired.

Fourth Embodiment

Figure 13:
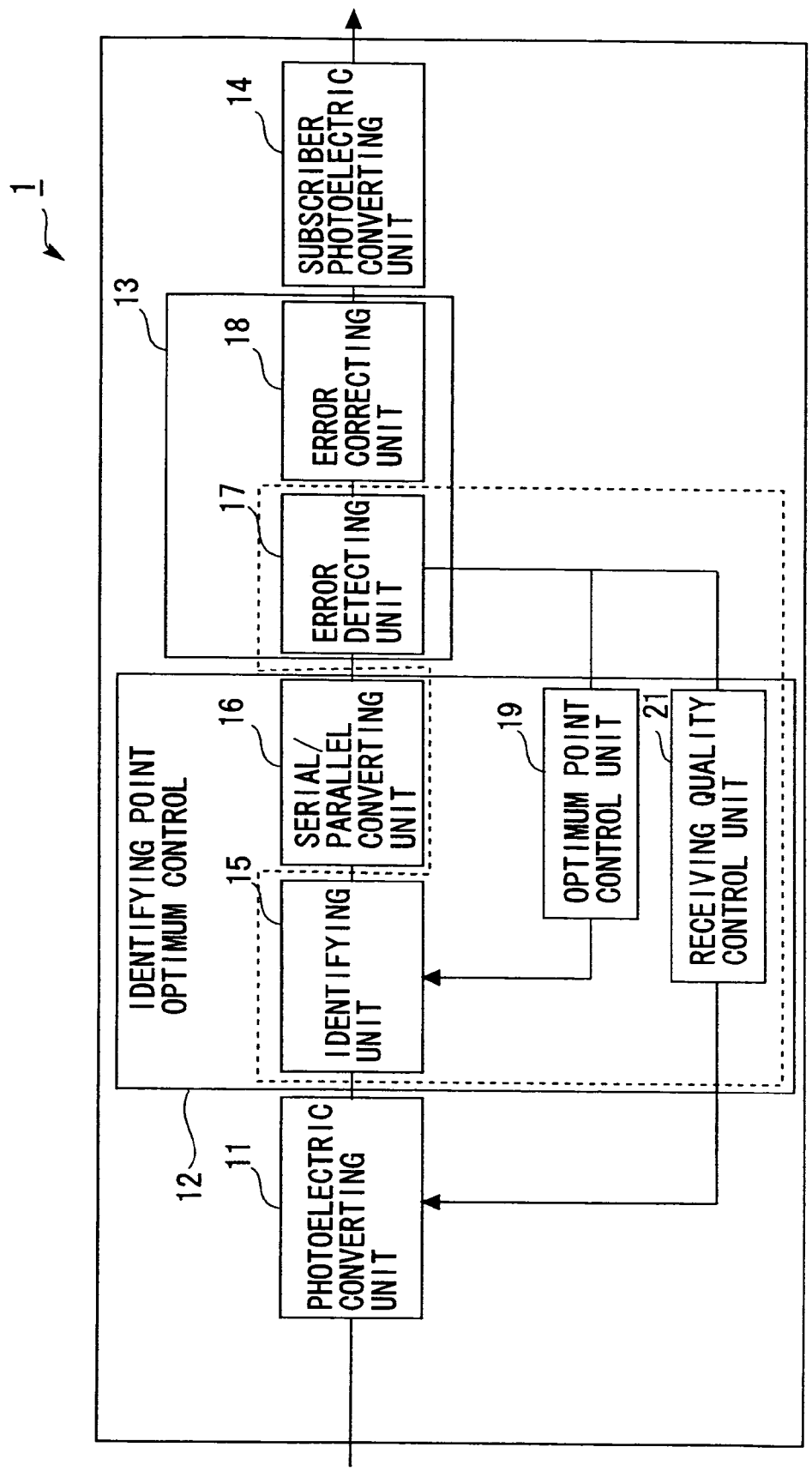
FIG. 13 is a diagram of an outline of configuration in a fourth embodiment of the present invention.
Figure 14:
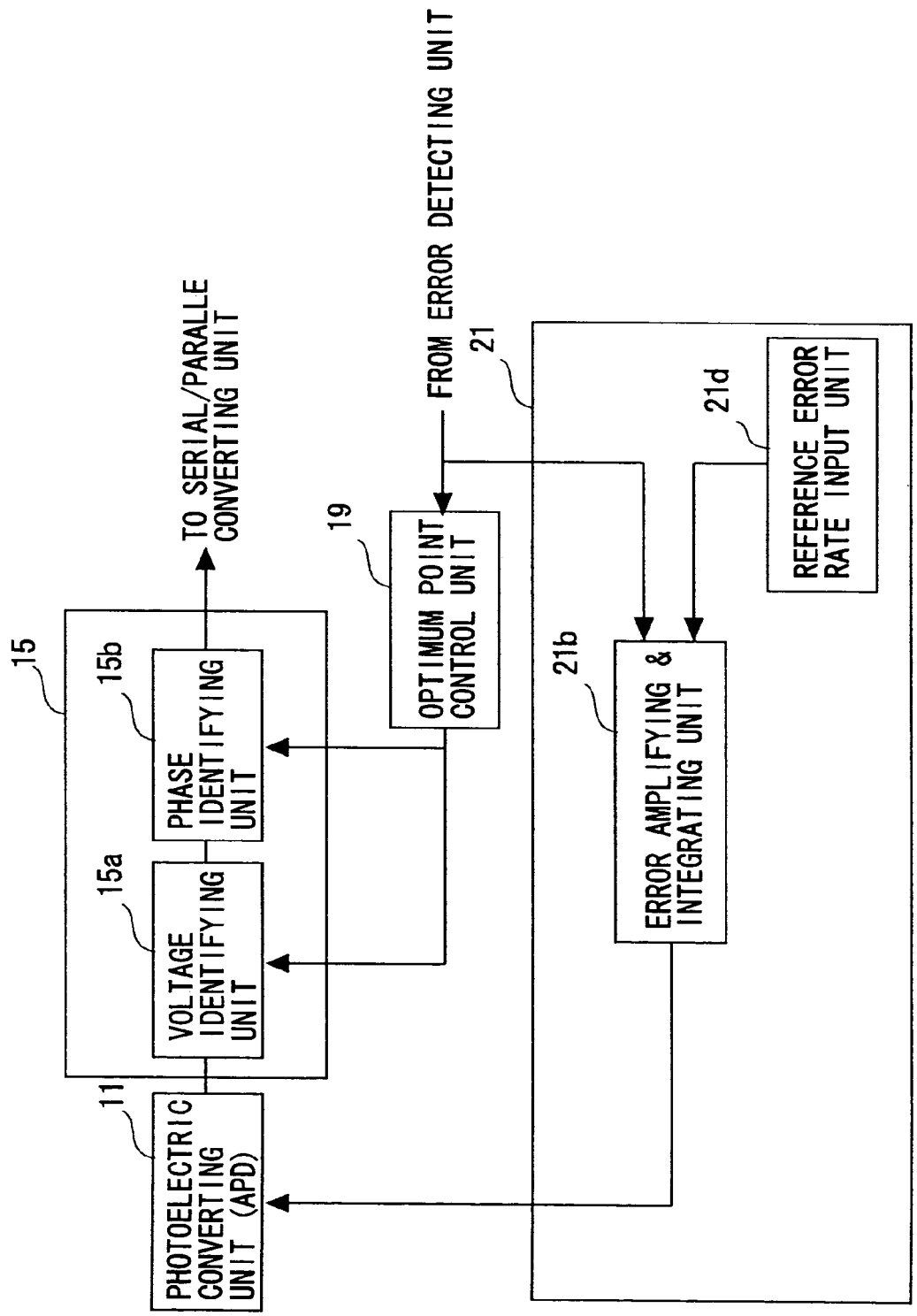
FIG. 14 is a block diagram of principal units in the fourth embodiment of the present invention.

FIGS. 13 and 14 are diagrams of principal units in a fourth embodiment according to the present invention. A different point of the fourth embodiment from the first embodiment described above is that the quality of the receiving signal is controlled by controlling the photoelectric converting unit 11. Other configurations are substantially the same, and therefore the same components are marked with the same numerals and symbols in a way that omits their repetitive explanations.

The photoelectric converting unit 11 in the fourth embodiment involves using an APD (Avalanche Photo Diode) as a photoelectric converting element.

The quality control unit 21 inputs, to the photoelectric converting unit 11, a control signal in which a difference between the error rate detected by the error detecting unit 17 and the reference error rate is amplified by the error amplifying & integrating unit 21b.

The photoelectric converting unit 11 making variable a reverse bias voltage of the APD on the basis of the inputted control signal, thereby making a multiplication factor (gain) of the APD variable. To be specific, the photoelectric converting unit 11, the control signal increasing when the error rate detected by the error detecting unit 17 is by far larger than the reference error rate, increases the gain of the APD. Further, the photoelectric converting unit 11, the control signal decreasing when the error rate detected by the error detecting unit 17 gets approximate to the reference error rate, decreases the gain of the APD.

Thus, the photoelectric converting unit 11, the shot noise increasing when raising the gain of the APD, deteriorates the quality of the electric signal after the photoelectric conversion. Further, the photoelectric converting unit 11, the shot noise decreasing when reducing the gain of the APD, restrains the deterioration of the quality of the electric signal after the photoelectric conversion. Accordingly, the quality control unit 21 can control the quality of the receiving signal (the electric signal) in accordance with the error rate of the received signal.

As described above, according to the fourth embodiment, as in the first embodiment, even in the case of the small error rate, the control is conducted to obtain the proper error rate ERR2 without performing the control till reaching the excessively low optimum point ERR1, and hence the feedback control can be quickly executed.

Fifth Embodiment

Figure 15:
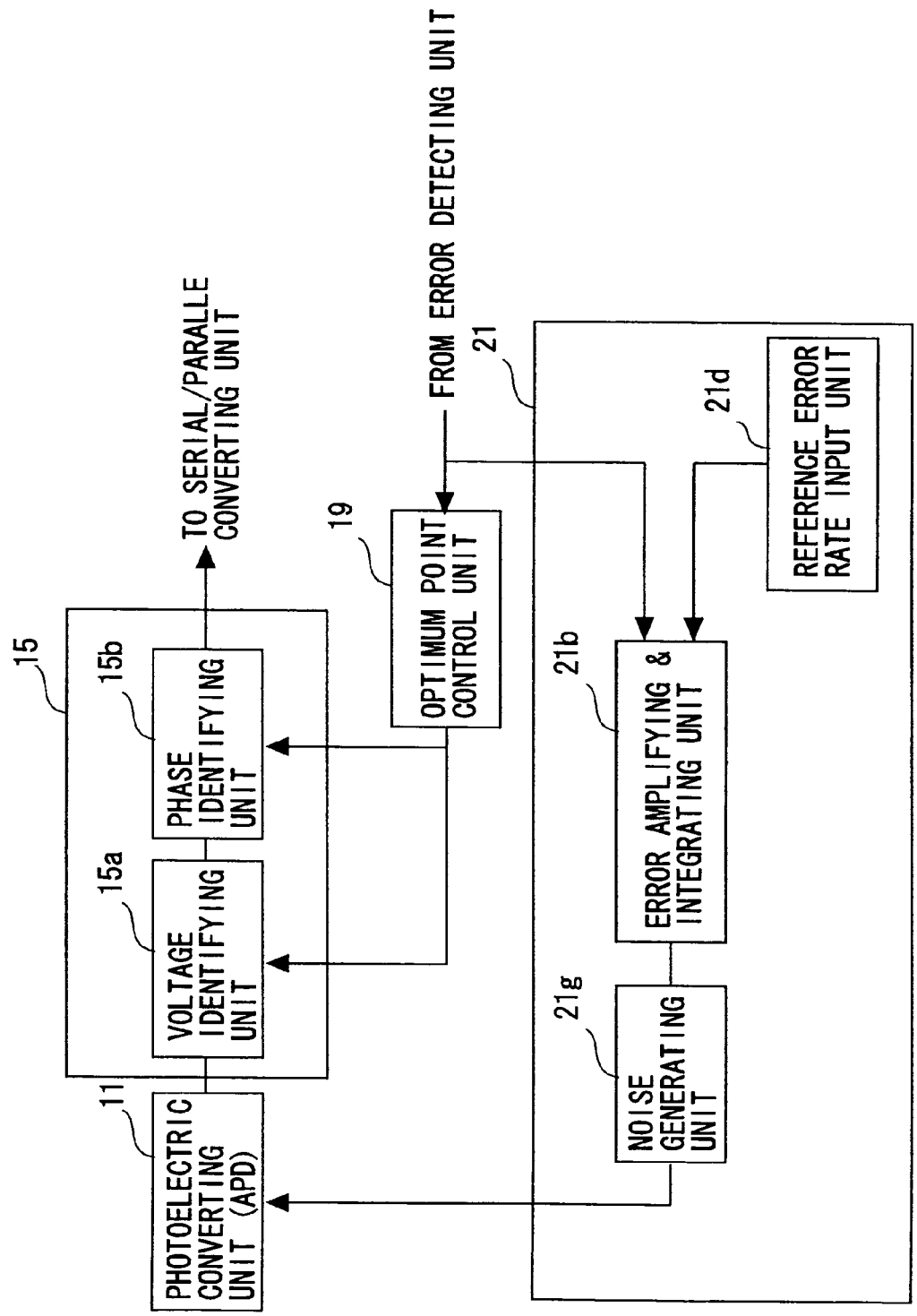
FIG. 15 is a block diagram of principal units in a fifth embodiment of the present invention.

FIG. 15 is a diagram showing a configuration of principal units in a fifth embodiment of the present invention. A different point of the fifth embodiment from the fourth embodiment discussed above is that the quality control unit includes a noise generating unit. Other configurations are substantially the same, and therefore the same components are marked with the same numerals and symbols in a way that omits their repetitive explanations.

The quality control unit 21 obtains a control signal in the way that the error amplifying & integrating unit 21b amplifies a difference between the error rate detected by the error detecting unit 17 and the reference error rate, and inputs this control signal to the noise generating unit 21g, and applies (superposes) the noise to the control signal in the form of multiplication. Then, the quality control unit 21 inputs this noise-superposed control signal as a reverse bias voltage of the APD to the photoelectric converting unit 11.

The photoelectric converting unit 11, when the noise of this reverse bias voltage rises, deteriorates the quality of the electric signal after the photoelectric conversion. Further, the photoelectric converting unit 11, when the noise of this reverse bias voltage decreases, restrains the deterioration of the quality of the electric signal after the photoelectric conversion. Accordingly, the quality control unit 21 is capable of controlling the quality of the receiving signal (the aforementioned electric signal) in accordance with the error rate of the received signal.

As discussed above according to the fifth embodiment, as in the fourth embodiment, even in the case of the small error rate, the control is conducted to obtain the proper error rate ERR2 without performing the control till reaching the excessively low optimum point ERR1, and hence the feedback control can be quickly executed.

In particular, according to the fifth embodiment, it is possible to control the quality of the receiving signal with a noise quantity corresponding to the error rate without largely fluctuating the reverse bias of the APD.

Sixth Embodiment

Figure 16:
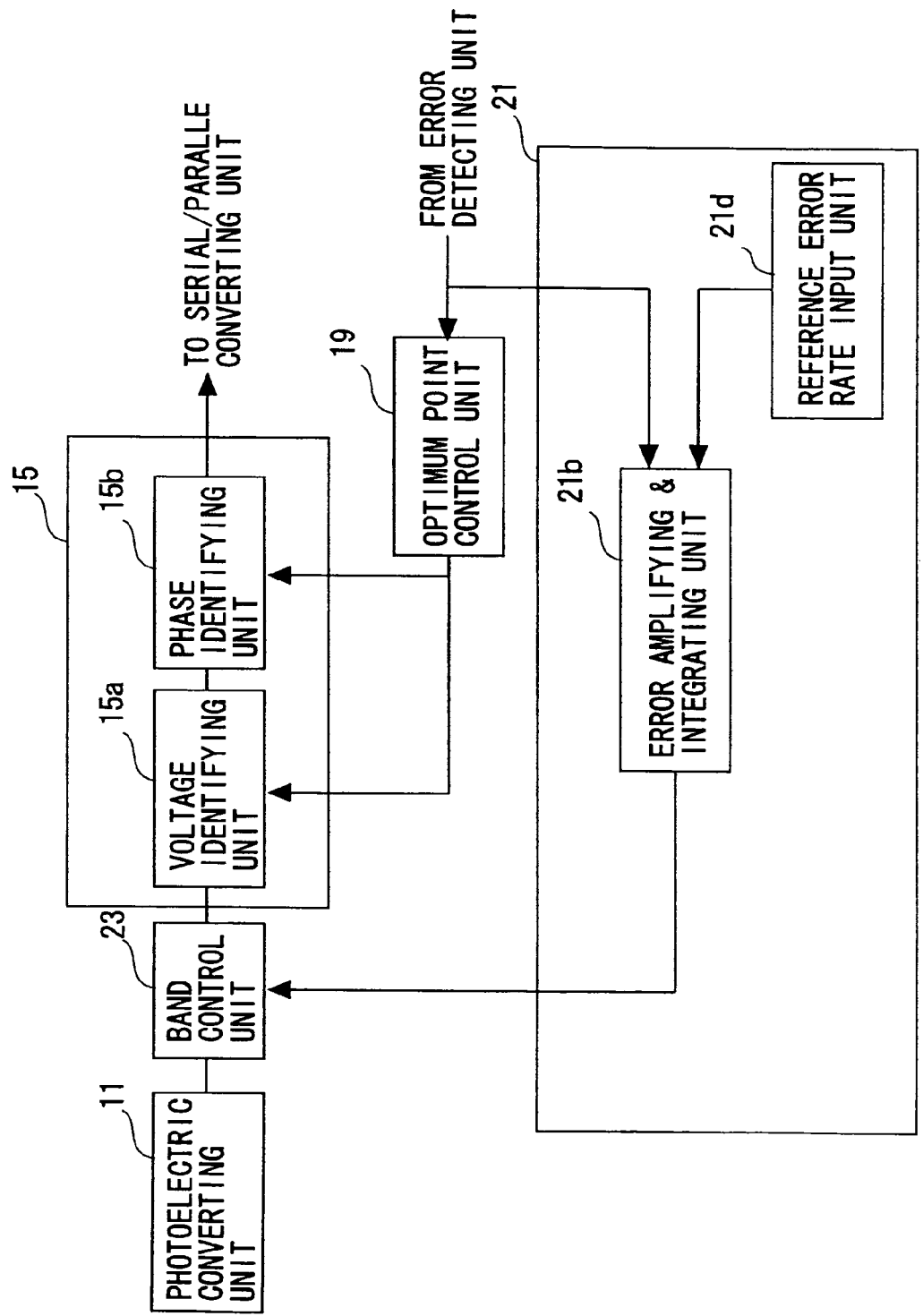
FIG. 16 is a block diagram of principal units in a sixth embodiment of the present invention.

FIG. 16 is a diagram showing a configuration of principal units in a sixth embodiment according to the present invention. A different point of the sixth embodiment from the fourth embodiment discussed above is that a band control unit controls the quality of the receiving signal. Other configurations are substantially the same, and therefore the same components are marked with the same numerals and symbols in a way that omits their repetitive explanations.

A band control unit 23 controls a band of the receiving signal converted into the electric signal by the photoelectric converting unit 11.

Further, the quality control unit 21 obtains a control signal in the way that the error amplifying & integrating unit 21b amplifies a difference between the error rate detected by the error detecting unit 17 and the reference error rate, and inputs this control signal to the band control unit 23.

The band control unit 23 controls the band of the receiving signal on the basis of the inputted control signal, and decreases the band when the error rate detected by the error detecting unit 17 is by far larger than the reference error rate. Further, the band control unit 23 increases the band when the error rate detected by the error detecting unit 17 gets approximate to the reference error rate.

Accordingly, when the band control unit 23 decreases the band of the receiving signal, inter-symbol interference is caused with the result that the quality of the receiving signal declines. Moreover, the band control unit 23 can prevent the occurrence of the inter-symbol interference and can retrain the deterioration of the quality of the receiving signal by increasing the band of the receiving signal. Hence, the quality control unit 21 can control the quality of the receiving signal in accordance with the error rate of the received signal.

As described above, according to the sixth embodiment, as in the fourth embodiment discussed above, even in the case of the small error rate, the control is conducted to obtain the proper error rate ERR2 without performing the control till reaching the excessively low optimum point ERR1, and hence the feedback control can be quickly executed.

Seventh Embodiment

Figure 17:
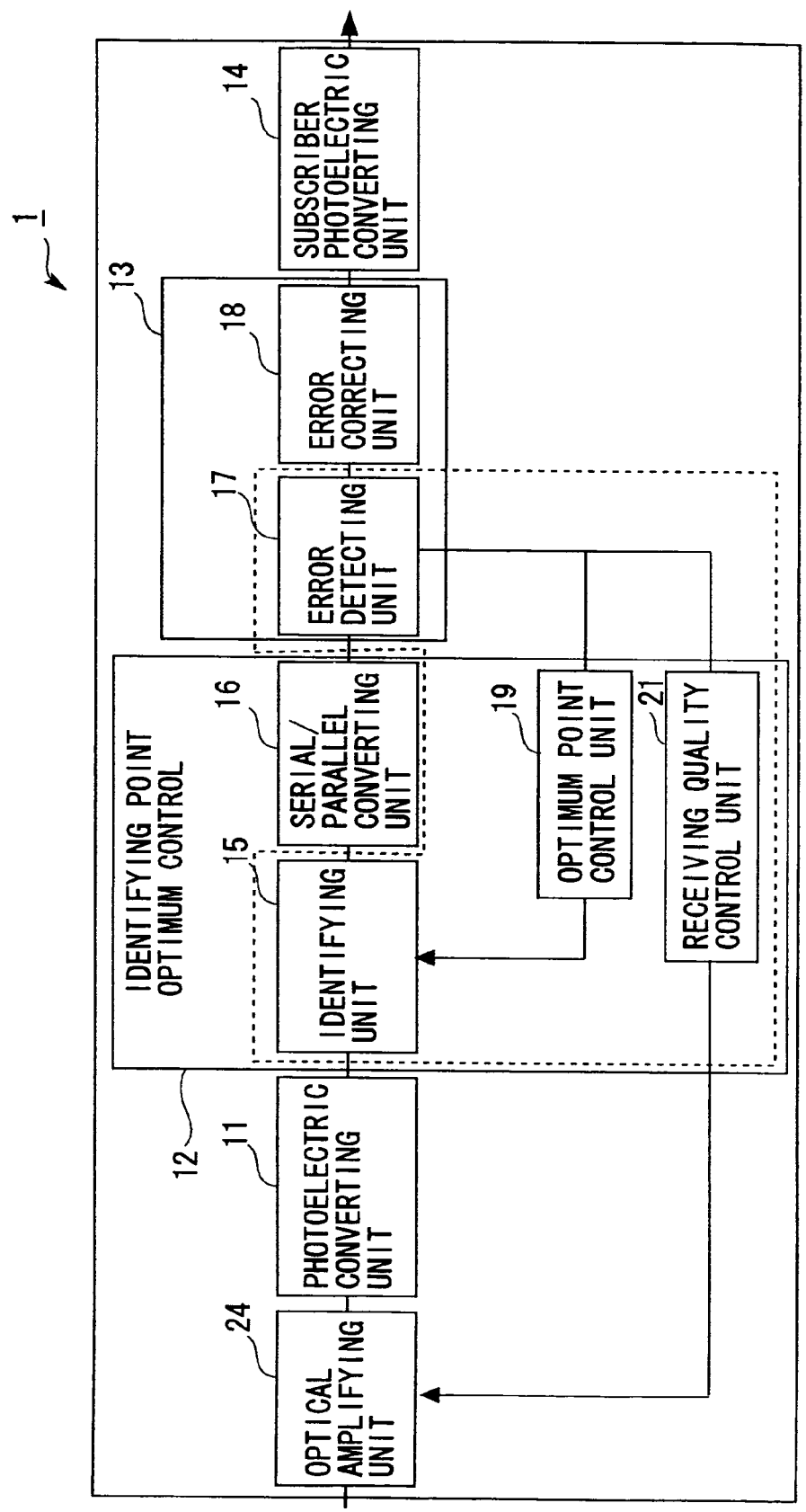
FIG. 17 is a diagram of an outline of configuration in a seventh embodiment of the present invention.
Figure 18:
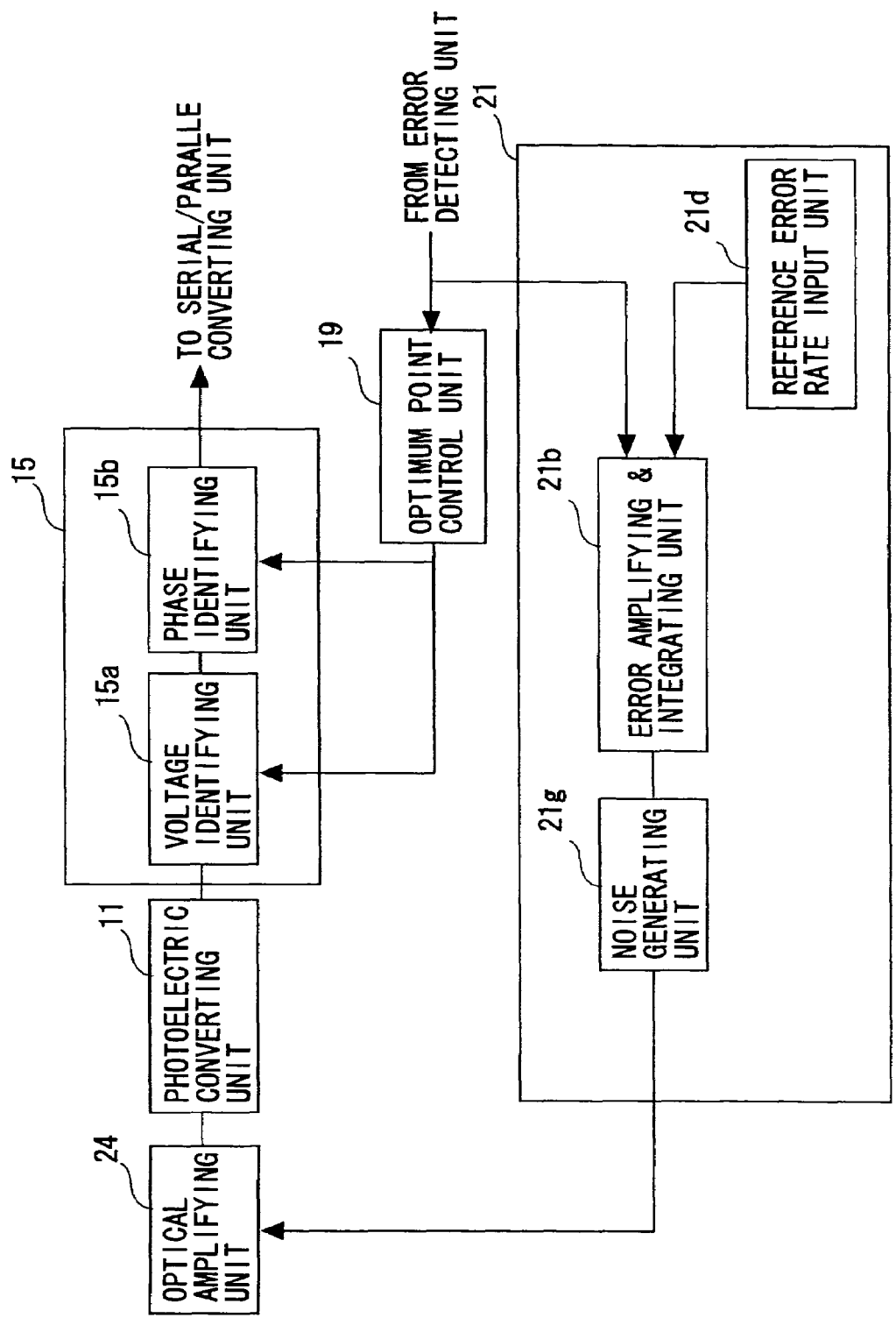
FIG. 18 is a block diagram of principal units in the seventh embodiment of the present invention.

FIGS. 17 and 18 are diagrams each showing a configuration of principal units in a seventh embodiment according to the present invention. A different point of the seventh embodiment from the fifth embodiment discussed above is that an optical amplifying unit controls the quality of the receiving signal. Other configurations are substantially the same, and therefore the same components are marked with the same numerals and symbols in a way that omits their repetitive explanations.

An optical amplifying unit 24 amplifies the optical signal demultiplexed by a wavelength demultiplexing unit 94.

Further, the quality control unit 21 obtains a control signal in the way that the error amplifying & integrating unit 21b amplifies a difference between the error rate detected by the error detecting unit 17 and the reference error rate, and inputs this control signal to the noise generating unit 21g, and applies (superposes) the noise to the control signal in the form of multiplication. Then, the quality control unit 21 inputs this noise-superposed control signal to the optical amplifying unit 24.

The optical amplifying unit 24, when the noise of this control signal rises, deteriorates the quality of the receiving signal after the optical amplification. Further, the photoelectric converting unit 11, when the noise of this control signal decreases, restrains the deterioration of the quality of the electric signal after the optical amplification. Accordingly, the quality control unit 21 is capable of controlling the quality of the receiving signal in accordance with the error rate of the received signal.

As discussed above, according to the seventh embodiment, as in the fifth embodiment, even in the case of the small error rate, the control is conducted to obtain the proper error rate ERR2 without performing the control till reaching the excessively low optimum point ERR1, and hence the feedback control can be quickly executed.

Eighth Embodiment

Figure 19:
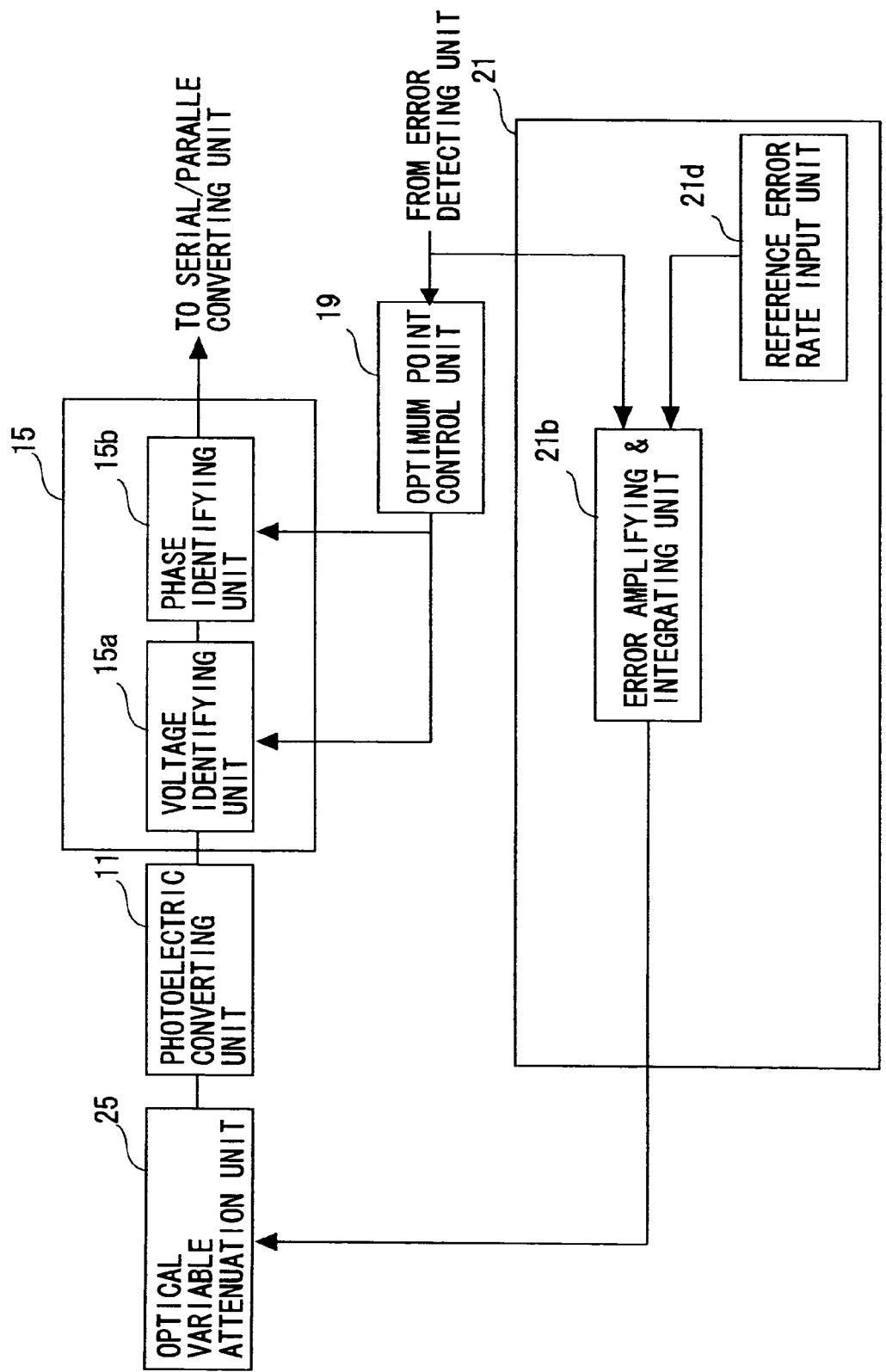
FIG. 19 is a block diagram of principal units in an eighth embodiment of the present invention.

FIG. 19 is a diagram showing a configuration of principal units in an eighth embodiment according to the present invention. A different point of the eighth embodiment from the fourth embodiment discussed above is that an optical variable attenuation unit controls the quality of the receiving signal. Other configurations are substantially the same, and therefore the same components are marked with the same numerals and symbols in a way that omits their repetitive explanations.

An optical variable attenuation unit 25 controls the quality of a received optical signal (which will hereinafter also be simply called a receiving signal) by attenuating the optical signal demultiplexed by the wavelength demultiplexing unit 94.

Further, the quality control unit 21 obtains a control signal in the way that the error amplifying & integrating unit (corresponding to a modulating unit) 21b amplifies a difference between the error rate detected by the error detecting unit 17 and the reference error rate, and inputs this control signal to the optical variable attenuation unit 25.

The optical variable attenuation unit 25 attenuates the receiving signal on the basis of the inputted control signal, and, when the error rate detected by the error detecting unit 17 is by far larger than the reference error rate, greatly attenuates the receiving signal. Moreover, the optical variable attenuation unit 25, when the error rate detected by the error detecting unit 17 gets approximate to the reference error rate, decreases the attenuation.

Accordingly, when the optical variable attenuation unit 25 attenuates the receiving signal, the SN ratio declines, and the quality is deteriorated. Moreover, the band control unit 23 can restrain the deterioration of the quality of the receiving signal by decreasing the attenuation of the receiving signal without causing any decline of the SN ratio. Hence, the quality control unit 21 can control the quality of the receiving signal in accordance with the error rate of the received signal.

As discussed above, according to the eighth embodiment, as in the fourth embodiment, even in the case of the small error rate, the control is conducted to obtain the proper error rate ERR2 without performing the control till reaching the excessively low optimum point ERR1, and hence the feedback control can be quickly executed.

Ninth Embodiment

Figure 20:
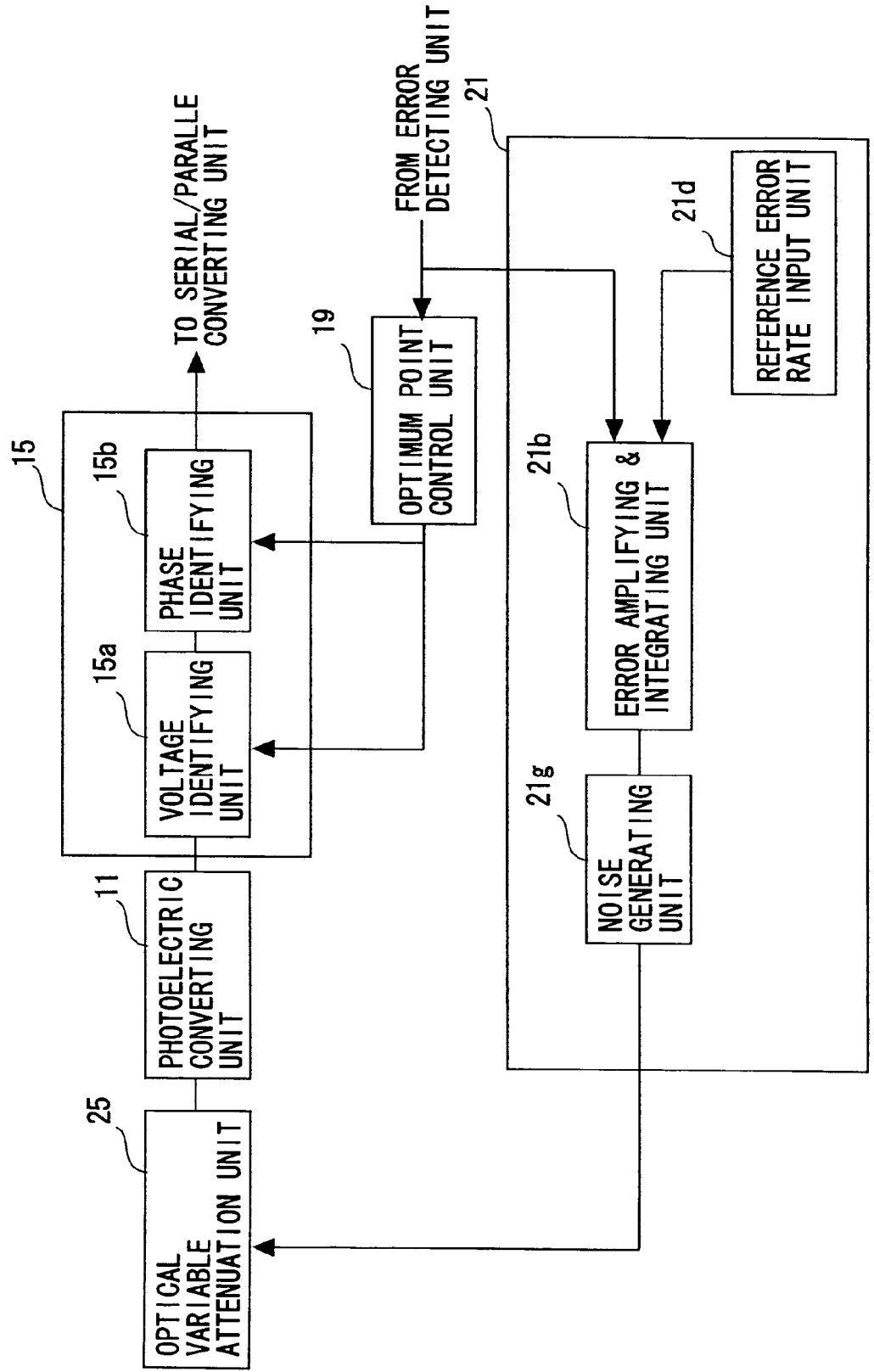
FIG. 20 is a block diagram of principal units in a ninth embodiment of the present invention.

FIG. 20 is a diagram showing a configuration of principal units in a ninth embodiment according to the present invention. A different point of the ninth embodiment from the seventh embodiment discussed above is that an optical attenuation unit controls the quality of the receiving signal. Other configurations are substantially the same, and therefore the same components are marked with the same numerals and symbols in a way that omits their repetitive explanations.

The optical variable attenuation unit 25 controls the quality of the received optical signal (which will hereinafter also be simply called a receiving signal) by attenuating the optical signal demultiplexed by the wavelength demultiplexing unit 94.

Further, the quality control unit 21 obtains a control signal in the way that the error amplifying & integrating unit (corresponding to the modulating unit) 21b amplifies a difference between the error rate detected by the error detecting unit 17 and the reference error rate, then inputs this control signal to the noise generating unit 21g, and applies (superposes) the noise to the control signal in the form of the multiplication. Then, the quality control unit 21 inputs the noise-superposed control signal to the optical variable attenuation unit 25.

The optical variable attenuation unit 25 attenuates the optical signal corresponding to the noise of this control signal and adds the noise to the optical signal. Therefore, the optical variable attenuation unit 25, when the noise of the control signal increases, deteriorates the quality of the receiving signal by causing the decline of the SN ratio of the receiving signal. Further, the optical variable attenuation unit 25, as the noise added to the receiving signal becomes small when the noise of the control signal decreases, restrains the deterioration of the quality of the receiving signal. Accordingly, the quality control unit 21 can control the quality of the receiving signal in accordance with the error rate of the received signal.

As discussed above, according to the ninth embodiment, as in the seventh embodiment, even in the case of the small error rate, the control is conducted to obtain the proper error rate ERR2 without performing the control till reaching the excessively low optimum point ERR1, and hence the feedback control can be quickly executed.

Particularly, according to the ninth embodiment, the quality of the receiving signal can be controlled with a noise quantity corresponding to the error rate without greatly attenuating the receiving signal.

Tenth Embodiment

Figure 21:
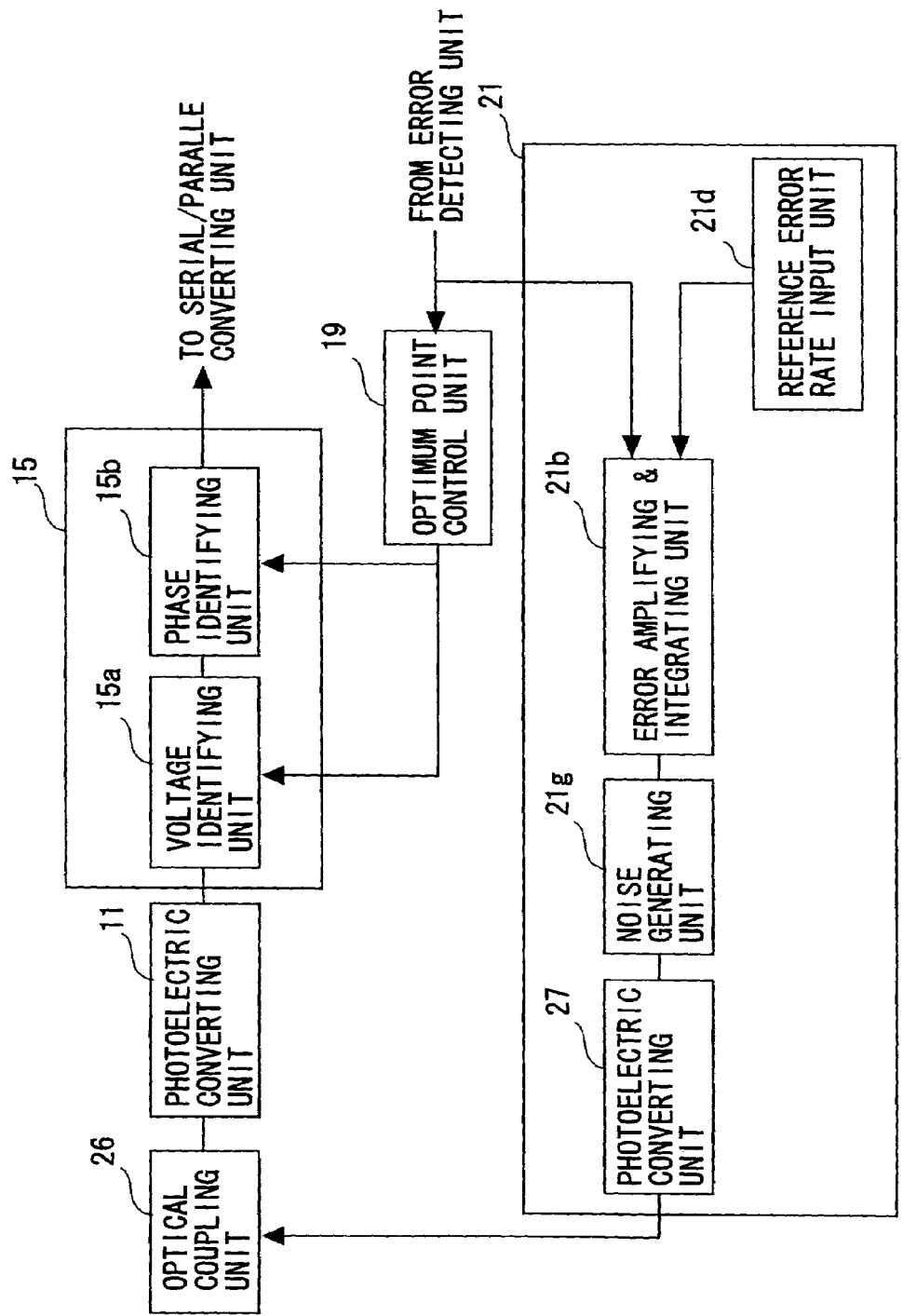
FIG. 21 is a block diagram of principal units in a tenth embodiment of the present invention.

FIG. 21 is a diagram showing a configuration of principal units in a tenth embodiment according to the present invention. A different point of the tenth embodiment from the seventh embodiment discussed above is that an optical coupling unit controls the quality of the receiving signal. Other configurations are substantially the same, and therefore the same components are marked with the same numerals and symbols in a way that omits their repetitive explanations.

An optical coupling unit 26 controls the quality of the receiving signal by coupling the control signal given from the quality control unit 21 to the received optical signal (which will hereinafter also be simply called the receiving signal).

Further, the quality control unit 21 obtains a control signal in the way that the error amplifying & integrating unit 21b amplifies a difference between the error rate detected by the error detecting unit 17 and the reference error rate, then inputs this control signal to the noise generating unit 21g, and applies (superposes) the noise to the control signal in the form of the multiplication. Then, the quality control unit 21 inputs, after the photoelectric converting unit 27 has converted this noise-superposed control signal into an optical signal, this optical signal to the optical coupling unit 26.

The optical coupling unit 26 couples the control signal given from this quality control unit 21 to the receiving signal. Hence, the optical coupling unit 26, when the noise of this control signal rises, deteriorates the quality of the receiving signal by causing the decline of the SN ratio of the receiving signal. Further, the optical coupling unit 26, as the noise added to the receiving signal becomes small when the noise of the control signal decreases, restrains the deterioration of the quality of the receiving signal. The quality control unit 21 is therefore capable of controlling the quality of the receiving signal in accordance with the error rate of the received signal.

As discussed above, according to the tenth embodiment, as in the seventh embodiment, even in the case of the small error rate, the control is conducted to obtain the proper error rate ERR2 without performing the control till reaching the excessively low optimum point ERR1, and hence the feedback control can be quickly executed.

Note that the present invention is not limited to only the embodiments illustrated above and can be, as a matter of course, changed in a variety of forms within the range that does not deviate from the gist of the present invention.

INDUSTRIAL APPLICABILITY

As explained above, according to the present invention, in the case of the low error rate, the converging time for executing the feedback control can be reduced by controlling the quality of the receiving signal.

What is claimed is:

1. A receiving error rate control device comprising:
   an identifying unit identifying a received signal by comparing the received signal with a reference value;
   an error detecting unit detecting an error rate of the signal identified by said identifying unit;
   a feedback control unit controlling the reference value on the basis of the error rate detected by said error detecting unit; and
   a quality control unit controlling an error rate of a post-identifying signal with respect to the received signal so that the error rate of said post-identifying signal approximates a predetermined error rate by increasing the error rate of said post-identifying signal based on the error rate detected by said error detecting unit, if said error rate detected is lower than a reference error rate.

2. receiving error rate control device comprising;
   an identifying unit identifying a received signal by comparing the received signal with a reference value;
   an error detecting unit detecting an error rate of the signal identified by said identifying unit;
   a feedback control unit controlling the reference value on the basis of the error rate detected by said error detecting unit; and a quality control unit performing control of making erroneous a post-identifying signal with respect to the received signal on the basis of the error rate detected by said error detecting unit, wherein said identifying unit includes a voltage identifying unit identifying the received signal by comparing the received signal with an identifying voltage serving as the reference value, said feedback control unit controls the identifying voltage on the basis of the error rate detected by said error detecting unit, and said quality control unit includes an amplifying unit amplifying a difference between the error rate detected by said error rate detecting unit and a reference error rate and a modulating unit amplitude-modulating a noise corresponding to the amplitude difference, and adds the amplitude-modulated noise to the identifying voltage.

3. A receiving error rate control device according to claim 2, wherein said identifying unit further includes identifying unit identifying the received signal on the basis of a reference phase.

4. A receiving error rate control device according to claim 2, wherein said quality control unit includes a noise generating unit generating a thermal noise as said "noise", and a gain variable unit controlling a noise quantity by amplifying the thermal noise.

5. A receiving error rate control device comprising:
a photoelectric converting unit converting a received optical signal into an electric signal;
an identifying unit identifying the electric signal by comparing the electric signal with a reference value;
an error detecting unit detecting an error rate of the signal detected by said identifying unit;
a feedback control unit controlling the reference value on the basis of the error rate detected by said error detecting unit; and
a quality control unit controlling an error rate of a post-identifying signal with respect to the electric signal that is subjected to the conversion so that the error rate of said post-identifying signal approximates a predetermined error rate by increasing the error rate of said post-identifying signal based on the error rate detected by said error detecting unit, if said error rate detected is lower than a reference error rate.

6. A receiving error rate control device comprising:
a photoelectric converting unit converting a received optical signal into an electric signal by use of an avalanche photo diode;
an identifying unit identifying the electric signal by comparing the electric signal with a reference value;
an error detecting unit detecting an error rate of the signal detected by said identifying unit;
a feedback control unit controlling the reference value on the basis of the error rate detected by said error detecting unit; and
a quality control unit controlling a quality by making erroneous a post-identifying signal with respect to the electric signal that is subjected to the conversion by said photoelectric converting unit by changing a reverse bias voltage of the avalanche photo diode on the basis of the error rate detected by said error detecting unit.

7. A receiving error rate control device according to claim 6, wherein said quality control unit includes a noise generating unit generating a noise and a modulating unit modulating the reverse bias voltage of the avalanche photo diode by use of the noise.

8. A receiving error rate control device comprising:
a photoelectric converting unit converting a received optical signal into an electric signal;
a band control unit controlling a band of the electric signal;
an identifying unit identifying the electric signal by comparing the electric signal with a reference value;
a detecting unit detecting an error rate of the signal identified by said identifying unit;
a feedback control unit controlling the reference value on the basis of the error rate detected by said error detecting unit; and
a quality control unit controlling an error rate of said electric signal so that the error rate of said electric signal approximates a predetermined error rate by increasing the error rate of said electric signal by controlling a voltage of said band control unit based on the error rate detected by said error detecting unit, if said error rate detected is lower than a reference error rate.

9. A receiving error rate control device comprising:
an optical amplifying unit amplifying a received optical signal;
a photoelectric converting unit converting the received optical signal into an electric signal;
an identifying unit identifying the electric signal by comparing the electric signal with a reference value;
an error detecting unit detecting an error rate of the signal identified by said identifying unit;
a feedback control unit controlling the reference value on the basis of the error rate detected by said error rate detecting unit; and
a quality control unit controlling an error rate of said optical signal so that the error rate of said optical signal approximates a predetermined error rate by increasing the error rate of said optical signal by modulating a control voltage of said optical amplifying unit based on the error rate detected by said error detecting unit, if said error rate detected is lower than a reference error rate.

10. A receiving error rate control device comprising:
an optical attenuation unit attenuating a received optical signal;
a photoelectric converting unit converting the received optical signal into an electric signal;
an identifying unit identifying the electric signal by comparing the electric signal with a reference value;
an error detecting unit detecting an error rate of the signal identified by said identifying unit;
a feedback control unit controlling the reference value on the basis of the error rate detected by said error rate detecting unit;
and a quality control unit controlling an error rate of said optical signal so that the error rate of said optical signal approximates a predetermined error rate by increasing the error rate of said optical signal by modulating a control voltage of said optical attenuation unit based on the error rate detected by said error detecting unit, if said error rate detected is lower than a reference error rate.

11. A receiving error rate control device comprising:
an optical attenuation unit attenuating a received optical signal;

a photoelectric converting unit converting the received optical signal into an electric signal;

an identifying unit identifying the electric signal by comparing the electric signal with a reference value;

an error detecting unit detecting an error rate of the signal identified by said identifying unit;

a feedback control unit controlling the reference value on the basis of the error rate detected by said error rate detecting unit; and a quality control unit controlling a quality of the optical signal by modulating a control voltage of said optical attenuation unit on the basis of the error rate detected by said error rate detecting unit, wherein said quality control unit includes a noise generating unit generating a noise and a modulating unit modulating the control voltage of said attenuation unit by use of this noise.

12. A receiving error rate control device comprising:

a photoelectric converting unit converting a received optical signal into an electric signal;

an identifying unit identifying the electric signal by comparing the electric signal with a reference value;

an error detecting unit detecting an error rate of the signal identified by said identifying unit;

a feedback control unit controlling the reference value on the basis of the error rate detected by said error rate detecting unit; and a quality control unit controlling an error rate of said optical signal so that the error rate of said optical signal approximates a predetermined error rate by increasing the error rate of said optical signal based on the error rate detected by said error detecting unit, if said error rate detected is lower than a reference error rate.

13. A receiving error rate control device comprising:

a photoelectric converting unit converting a received optical signal into an electrical signal;

an identifying unit identifying the electric signal by comparing the electric signal with a reference value;

an error detecting unit detecting an error rate of the signal identified by said identifying unit;

a feedback control unit controlling the reference value on the basis of the error rate detected by said error rate detecting unit; and a quality control unit controlling a quality of the optical signal on the basis of the error rate detected by said error rate detecting unit, wherein said quality control unit includes an amplifying unit amplifying a difference between the error rate detected by said error detecting unit and a reference error rate, a noise generating unit generating a noise corresponding to this amplified difference, a photo electric converting unit converting the noise into an optical signal, and an optical coupling unit adding the noise converted into the optical signal to an optical signal to be received by said photoelectric converting unit.

* * * * *

UNITED STATES PATENT AND TRADEMARK OFFICE
CERTIFICATE OF CORRECTION

| | |
|---|---|
| PATENT NO. | : 7,277,633 B2 |
| APPLICATION NO. | : 11/236633 |
| DATED | : October 2, 2007 |
| INVENTOR(S) | : Satoshi Yamamoto |

It is certified that error appears in the above-identified patent and that said Letters Patent is hereby corrected as shown below:

Column 15, Line 16, Claim 2, change "amplitude" to --amplified--.

Column 15, Line 20, Claim 3, after "includes" insert --a phase--.

Column 15, Line 25, Claim 4, change ""noise"," to --noise,--.

Signed and Sealed this

Twenty-second Day of July, 2008

JON W. DUDAS
*Director of the United States Patent and Trademark Office*